(12) United States Patent
King et al.

(10) Patent No.: US 12,104,971 B2
(45) Date of Patent: Oct. 1, 2024

(54) METHOD AND SYSTEM FOR OPTICAL FORCE MEASUREMENT

(71) Applicant: LUMICKS CA HOLDING B.V., Amsterdam (NL)

(72) Inventors: Graeme Alan King, Amsterdam (NL); Andreas Sebastian Biebricher, Amsterdam (NL); Iddo Heller, Amsterdam (NL); Erwin Johannes Gerard Peterman, Amsterdam (NL); Gijs Jan Lodewijk Wuite, Amsterdam (NL)

(73) Assignee: LUMICKS CA HOLDING B.V. (NL)

(*) Notice: Subject to any disclaimer, the term of this patent is extended or adjusted under 35 U.S.C. 154(b) by 462 days.

(21) Appl. No.: 17/497,338

(22) Filed: Oct. 8, 2021

(65) Prior Publication Data

US 2022/0026291 A1  Jan. 27, 2022

Related U.S. Application Data

(63) Continuation of application No. 16/764,275, filed as application No. PCT/NL2018/050774 on Nov. 19, 2018, now Pat. No. 11,156,513.

(30) Foreign Application Priority Data

Nov. 17, 2017  (NL) ..................................... 2019937

(51) Int. Cl.
*G01L 1/24* (2006.01)
*G01N 15/14* (2006.01)
(Continued)

(52) U.S. Cl.
CPC ............ *G01L 1/24* (2013.01); *G01N 15/1425* (2013.01); *G02B 21/0004* (2013.01); *G02B 21/06* (2013.01)

(58) Field of Classification Search
CPC ................ G02B 21/06; G02B 21/0004; G01N 15/1425; G01L 1/24
(Continued)

(56) References Cited

U.S. PATENT DOCUMENTS

| | | |
|---|---|---|
| 3,096,388 A | 7/1963 | Davenport |
| 2004/0191789 A1 | 9/2004 | Manaresi et al. |

(Continued)

FOREIGN PATENT DOCUMENTS

| | | | | |
|---|---|---|---|---|
| WO | WO-2014063843 A1 * | 5/2014 | ....... | A61F 13/00059 |
| WO | WO-2014189898 A1 * | 11/2014 | ............. | G01N 15/10 |

OTHER PUBLICATIONS

Translation of WO-2014063843-A1 (Year: 2014).*
(Continued)

*Primary Examiner* — Nathaniel T Woodward
(74) *Attorney, Agent, or Firm* — Mendelsohn Dunleavy, P.C.

(57) ABSTRACT

One aspect of this disclosure relates to a computer-implemented method for determining a force acting on at least part of a structure, for example a biological structure, such as a DNA molecule. The method comprises controlling a light-sensitive system, e.g. of a microscope, to determine light information based on light from the structure. The light is incident on at least a part of the light sensitive system. The light-sensitive system may be said to capture the light from the structure. The at least part of the structure comprises one or more optically active entities, such as DNA intercalator molecules and donor/acceptor fluorophores. At least one of (i) an optical activity of the entities and (ii) a quantity of the entities depends on the force acting on the at least part of the structure. Furthermore, the light information defines a light property value associated with said at least part of the structure. The method further comprises determining the (Continued)

force acting on the at least part of the structure on the basis of said light property value and a reference light property value.

17 Claims, 9 Drawing Sheets

(51) Int. Cl.
 *G02B 21/00* (2006.01)
 *G02B 21/06* (2006.01)
(58) Field of Classification Search
 USPC .......................................................... 73/800
 See application file for complete search history.

(56) References Cited

U.S. PATENT DOCUMENTS

| | | | |
|---|---|---|---|
| 2011/0059864 A1 | 3/2011 | Farinas et al. | |
| 2013/0220032 A1* | 8/2013 | Packirisamy | G01D 5/353 73/862.624 |
| 2015/0122977 A1* | 5/2015 | Halvorsen | G01N 15/1436 250/214.1 |
| 2015/0355040 A1* | 12/2015 | Sirbuly | G01L 1/242 356/73.1 |

OTHER PUBLICATIONS

Biebricher, Andreas S., et al. "The impact of DNA intercalators on DNA and DNA-processing enzymes elucidated through force-dependent binding kinetics." Nature Communications 6 (2015): 7304-7315.

Wang, Xuefeng, et al. "Defining Single Molecular Forces Required to Activate Integrin and Notch Signaling." Science 340.6135 (2013): 991-994.

McGhee, J. D., et al. "Erratum: Theoretical aspects of DNA-protein interactions: Co-operative and non-co-operative binding of large ligands to a one-dimensional homogeneous lattice." Journal of Molecular Biology 103.3 (1976): 679.

International Search Report and Written Opinion for corresponding International application No. PCT/NL2018/050774; dated Feb. 28, 2019 (10 pages).

Communication pursuant to Article 94(3) EPC for corresponding European application No. 18839894.5; dated Mar. 22, 2024 (4 pages).

Buckley, Leonard J., et al. "Fiber optic strain measurements using an optically-active polymer." Smart Materials and Structures 1.1 (1992): 1-4.

Català, Frederic, et al. "Extending calibration-free force measurements to optically-trapped rod-shaped samples." Scientific Reports 7.1 Article 42960 (2017): 1-10.

Kamadi, Mohammad, et al. "Enantio-specific Detection of Chiral Nano-Samples Using Photo-induced Force." Arxiv.org, arXiv:1709.08719 (2017): 1-16.

* cited by examiner

METHOD AND SYSTEM FOR OPTICAL FORCE MEASUREMENT

CROSS-REFERENCE TO RELATED APPLICATIONS

This is a continuation of co-pending application Ser. No. 16/764,275, the teachings of which are incorporated herein by reference in their entirety.

FIELD OF THE INVENTION

This disclosure relates to a method, a controller and a computer program for determining a force acting on at least part of a structure based on light from the structure.

BACKGROUND

The ability to sensitively detect forces acting on and/or within biological structures, such as DNA, proteins and cells, is of great importance as a means to understand the mechanics and physical interactions that govern biological function. For example, in protein unfolding experiments the forces involved are monitored in order to determine the mechanical force at which a protein domain unfolds. As another example, in the field of molecular motors, it is examined how enzymatic reactions can generate force to drive directed motion along a substrate of DNA or to transport cargo along the cytoskeleton. In the field of DNA origami, molecular structures are synthesized that have internal tension or of which the mechanical properties are important for their designed function, such as to study the interacting forces between DNA and proteins. In force measurement experiments, typically force spectroscopy techniques are utilized, for example involving optical tweezers holding beads that are bound to a structure of interest. The traps holding the beads are usually calibrated which enables to determine a force that causes a movement of a bead within the trap. Disadvantageously, such experiments require the use of advanced technology.

Experiments involving force spectroscopy techniques are described in "Biebricher, A. S. et al. The impact of DNA intercalators on DNA and DNA-processing enzymes elucidated through force-dependent binding kinetics. *Nat. Commun.* 6:7304 doi: 10.1038/ncomms8304 (2015)". Biebricher discloses experiments that aim to elucidate the impact of DNA intercalator molecules on DNA and DNA-processing enzymes. DNA intercalator molecules are namely widely used as fluorescent probes to visualize and study DNA processes. To this end, a tension-dependent binding constant is determined based on measured force-elongation curves. For obtaining these curves, the applied forces are measured using conventional back-focal plane interferometry and the associated elongations are measured using either conventional camera tracking or are calculated based on fluorescence intensity measurements.

Wang and Ha, "Defining Single Molecular Forces Required to Activate Integrin and Notch Signaling", Science 340, 991-994 (2013) describe a method for estimating the molecular forces that are required for activating intracellular signalling using tension-gauge tethers. Herein, a ligand for a membrane receptor is immobilized on a surface through a tether, which ruptures if a force higher than a critical force is applied to it. When a receptor of a molecule engages with and applies tension to the ligand, the tether thus may or may not rupture. If signal activation through the receptor requires a molecular force larger than the critical force of the tether, it will rupture, abolishing signal activation. In contrast, if the required force is smaller than the critical force, the tether will endure, activating the receptor-mediated signalling. By engineering a series of tethers that rupture at different forces, the force required for signal activation can be determined.

Disadvantageously, this method requires multiple tethers respectively associated with different critical forces to be engineered. Furthermore, the method only allows to determine that an applied force is within a range between two consecutive critical forces associated with two respective tethers. However, it is difficult to construct a series of tethers such that they have densely and precisely defined critical forces. Hence, the accuracy of this method is limited. Further, this method is not suitable for continuously measuring a force that varies with time. In an example, a force initially increases to a maximum force and then decreases. In such case, once the force has reached its maximum, the tethers having a critical force lower than the maximum force will have been ruptured. As a result, no means are left to measure the decrease of the force.

Hence, there is a need in the art for an improved method for measuring forces applied to structures that alleviates at least some of the problems identified above.

SUMMARY

Therefore, one aspect of this disclosure relates to a computer-implemented method for determining a force acting on at least part of a structure, for example a biological structure, such as a DNA molecule. The method comprises controlling a light-sensitive system, e.g. a light-sensitive system of a microscope, to determine light information based on light from the structure. The light is incident on at least a part of the light sensitive system. The light-sensitive system may be said to capture the light from the structure. The at least part of the structure comprises one or more optically active entities, such as DNA intercalator molecules and donor/acceptor fluorophores. At least one of (i) an optical activity of the entities and (ii) a quantity of the entities depends on the force acting on the at least part of the structure. Furthermore, the light information defines a light property value associated with said at least part of the structure. The method further comprises determining the force acting on the at least part of the structure on the basis of said light property value. Optionally, the method comprises determining the force based on a reference light property value as well. The reference light property value may be pre-stored in a data storage and may be associated with a reference force.

One distinct aspect of this disclosure relates to a method for causing at least part of a structure to exhibit a force dependent optical activity for enabling determination of a force acting on the at least part of the structure in accordance with one or more of the methods for determining a force as described herein. The method comprises combining the at least part of the structure, a fluid and optically active entities. The optically active entities in the fluid can bind to the at least part of the structure. A binding property in respect of the at least part of the structure depends on the force acting on the at least part of the structure thus causing that the quantity of the entities comprised by the structure depends on the force acting on the structure. Additionally or alternatively to a binding property, an optical property of optically active entities bound to the at least part of the structure depends on the force acting on the at least part of the structure.

Optionally an optical property, such as a quantum yield, of an optically active entity depends on whether the entity is bound or unbound to the at least part of the structure.

It should be appreciated that the above-mentioned method for determining the force acting on the at least part of the structure optionally comprises one or more of the method steps of methods described herein for causing at least part of the structure to exhibit a force dependent optical activity.

The methods disclosed herein enable to determine a force acting on a structure without the need to engineer multiple tethers that rupture at different critical forces. Advantageously, the disclosed method further does not require complex force detection systems, such as systems comprising calibrated optical or acoustical traps, that may also require attaching microscopic beads to the structure, as is typically done in optical tweezer experiments. The disclosed method enables to measure the magnitude of forces using relatively simple experimental set-ups and general purpose equipment. Hence, the technologies disclosed herein obviate the need to build complex force detection systems and/or attach microscopic beads as is typically done in e.g. optical tweezer experiment. Since at least one of a quantity and an optical property of the optically active entities depends on the force acting on the structure, the at least part of the structure exhibits a force-dependent optical activity and hence, a property of the captured light is relatable to the magnitude of the acting force. Such property, and thus the optical activity and/or the light property value may relate to at least one of a light intensity, e.g. fluorescence intensity, light color and light polarization. In principle, an arbitrarily small change in force, will result in a change in the light property value as defined by the image data. In contrast, in force measurements using tension-gauge tethers, a force change will not necessarily result in a rupture of a tether. In such case, the force change will remain unnoticed. The disclosed methods herein thus provide an enhanced accuracy. The method further provides the advantage that the force may be continuously measured, since the method does not depend on the irreversible rupture of tethers, yet, for example, on the reversible increase and decrease of fluorescence. For example, the method enables to measure the varying magnitude of forces acting on a DNA molecule in real-time. Furthermore, the method enables to simultaneously measure forces that are acting on different structures or different parts of a structure that are present within the field of view of a fluorescence microscope.

In one embodiment, the structure comprises, e.g. consists of and/or is, a DNA molecule. This embodiment advantageously allows to study the forces acting on and/or within DNA molecules.

In one embodiment, the method comprises controlling a force application system to apply a force to the at least part of the structure. In particular, in one embodiment, the method comprises controlling a force application system to apply a further force to the at least part of the structure on the basis of the determined force. It should be appreciated that the force application system is not necessarily calibrated. An example of such a system would be a structure manipulation system for deforming, e.g. extending, the structure. In such a system, a deformation may be controlled, as a result of which a force is applied to the structure. This embodiment enables to both apply a force to the structure and subsequently measure the applied force. This measurement may then be used to adjust the applied force. Such a feedback loop enables to accurately apply forces to the structure without using any of a calibrated optical trap, an atomic force microscope or similar calibrated equipment.

In one embodiment, the method comprises controlling a force application system to change the force acting on the at least part of the structure. The embodiment comprises controlling the light-sensitive system to capture light from the structure while said force is changing. The light information defines, for a plurality of time instances, a light property value associated with said at least part of the structure. The embodiment further comprises, for each time instance, based on the light property value, determining the force acting on the at least part of the structure. This embodiment enables to continuously monitor the force acting on the at least part of the structure.

In one embodiment, the light-sensitive system comprises an imaging system and the light information comprises image data, that may be spatially resolved. The image data define a set of light property values associated with respective parts of the structure. In this embodiment the method further comprises, for each part, based on its associated light property value, determining a force acting on the part of the structure. This embodiment advantageously enables to measure the forces acting on different parts of the structure. This embodiment for example enables to measure the internal forces along extended molecular architectures, e.g. along the length of a DNA molecule. Hence, the magnitudes of local forces, in particular intra-DNA forces, may be measured. Such detailed force profiles enable to accurately study the mechanical and physical properties of dsDNA.

In one embodiment, the light-sensitive system comprises an imaging system and the light information comprises image data. The image data represent an image of the at least part of the structure and comprise a set of image pixel values associated with respective parts of the structure. In this embodiment, determining the force comprises determining one or more subsets of one or more image pixel values. Each subset defines a region of interest (ROI) in the image. Determining the force further comprises, for each ROI, determining the force acting on a part of the structure represented by the ROI based on the image pixel values defining the ROI. The image pixel values may represent the light property value as described herein. This embodiment also enables to measure the forces acting on different parts of the structure. This embodiment further allows for efficient processing of obtained image data and enables flexibility in determining an area of the structure on which an average force may be determined. In an example, the one or more subsets may be determined in response to a user input. A user may, when the image is rendered on a display, select the regions of interest in the image for which a force is to be determined. In this example, a user, by selecting a region of interest in the image, which region of interest represents a part of the structure, he selects a subset of one or more image pixel value based on which a force acting on the part represented by the region of interest is to be determined.

In one embodiment, the method comprises receiving a user input selecting an initial subset of image pixel values and the method further comprises determining the subset of image pixel values by trimming the user-selected subset of image pixel values, for example based on a criterium that the subset of image pixel value may comprise only image pixel values above or below a threshold value. This would allow a user to roughly select a subset of image pixel values, for example by "drawing" an area in an image presented to him, wherein the area comprises a representation of a part of the structure that is of interest to the user. Subsequently, the method may then comprise automatically selecting the image pixel values that actually correspond to the structure, and disregard the image pixel values within said area that do not correspond to the structure, which values may distort the force determination. In an example such disregarded image pixel values correspond to dark background image pixels.

In one embodiment, the light-sensitive system comprises an imaging system and the light information comprises image data. The image data define a set of light property values associated with respective plural structures, one of these structures being the above-mentioned structure. In this embodiment, the method further comprises, for each structure, based on its associated light property value, determining a force acting on the structure.

In this embodiment, in particular, the image data may define a set of light property values associated with respective parts of plural structures, one of these structures being the above-mentioned structure. Then, the method further comprises, for each part, based on its associated light property value, determining a force acting on the part.

In this embodiment, the plural structures may be similar structures. In an example these structures comprises or are DNA molecules. These embodiments enable to simultaneously measure forces acting on different structures and/or on different parts of different structures.

In one embodiment, the method comprises the steps of obtaining a parameter relating a difference of force magnitude to a difference in optical property value. In this embodiment the method also comprises determining the force acting on the at least part of the structure based on said parameter. The parameter may be pre-stored in a data storage connected to a controller. This embodiment thus advantageously enables to determine a difference between forces without requiring the application of known reference forces. The embodiment enables to determine a difference between two forces, even if these two forces are unknown.

In one embodiment, the method comprises controlling the light-sensitive system to determine reference light information based on reference light from a reference structure while a reference force is acting on at least a part of the reference structure. The reference light is incident on at least a part of the light-sensitive system. The at least part of the reference structure comprises one or more optically active reference entities. At least one of an optical activity of the reference entities and a quantity of the reference entities depends on the reference force acting on the at least part of the reference structure. The reference light information defines the reference light property value that is associated with said at least part of the reference structure.

The reference structure may be the same structure as the structure on which the to be determined force is acting, "the structure of interest". This allows to both calibrate the force measurement and measure the force using a single structure, wherein the calibration and the measurement may be performed in one experiment or different experiments. In case the reference structure is the same structure, the at least part of the reference structure may be the same as or different from the at least part of the structure of interest. In an example, the same part of the structure is analyzed twice subsequently. One time for calibrating the force measurement method and another time for determining a force acting on that part of the structure.

The reference structure may be a different structure from the structure of interest. This allows to perform a separate experiment on a separate structure for calibration. In yet another example, the reference structure may be imaged together with the structure of interest during a single experiment. This embodiment enables an absolute determination of the force applied to the at least part of the structure.

In one embodiment, the method comprises controlling the light sensitive system to determine second reference light information based on second reference light from a second reference structure while a second reference force is acting on at least a part of the second reference structure. The second reference light is incident on at least a part of the light-sensitive system. The at least part of the second reference structure comprises one or more optically active second reference entities. At least one of an optical activity of the second reference entities and a quantity of the second reference entities depends on the second reference force acting on the at least part of the second reference structure. The second reference light information defines a second reference light property value associated with said at least part of the second reference structure. In this embodiment, the method comprises determining the force acting on the at least part of the structure based on the second reference light property value.

In this embodiment, the step of determining the force may comprise determining, based on the reference light property value and second reference light property value, the parameter relating a difference of force magnitude to a difference in optical property value and determining the force acting on the at least part of the structure based on this parameter.

The second reference structure may or may not be the same as the structure of interest and may or may not be the same as the reference structure mentioned above. The at least part of the second reference structure may or may not be the same as the at least part of the structure and may or may not be the same as the at least part of the structure of interest.

This embodiment advantageously enables to experimentally determine the above-mentioned parameter relating a difference of force magnitude to a difference in light property value. Furthermore, this embodiment enables to obtain reference data associating a plurality of forces with a plurality of light property values, respectively. Then, the force may be determined based on these reference data.

In one embodiment, the structure is at least partially positioned in a fluid comprising optically active entities, such as DNA intercalators, e.g. cyanine intercalators, wherein a binding property of the optically active entities in respect of the at least part of the structure depends on the force acting on the at least part of the structure.

The fluid may further comprise additives, such as e.g. oxygen scavengers to reduce photobleaching or salts to regulate the physical properties of the at least part of the structure, and/or its interaction with optically active entities.

In this embodiment, the force-dependency of the optical activity of the structure is caused in an efficient manner. This embodiment allows to study local force profiles along a part of the structure without using a calibrated trap. In an example the local force profile along a structure may be determined, wherein the structure is tethered on only one side.

In one embodiment, additionally or alternatively to a binding property depending on force, other parameters of the optically active entities depend on the force acting on the at least part of the structure. In an example, the optically active entities exhibit an increased or decreased mobility, such as a thermal fluctuation, with increasing force applied to the at least part of the structure. In another example, a blinking of the optically active entities is dependent on the force on the structure.

In one embodiment, while the reference light is incident on at least a part of the light-sensitive system, a first concentration of optically active entities is present in the fluid. In this embodiment, the method further comprises controlling the light-sensitive system to determine second reference light information based on second reference light from the reference structure while the reference force is acting on at least a part of the reference structure. The second reference light being incident on at least a part of the light-sensitive system. While the second reference light is incident on the at least a part of the light-sensitive system, a second concentration of optically active entities different from the first concentration is present in the fluid. The second reference light information defines a second reference light property value associated with said at least part of the reference structure. In this embodiment, the method comprises determining the force acting on the at least part of the structure based on the second reference light property value. Advantageously this method enables to easily calibrate the method. Only a concentration of entities in the fluid needs to change, while an applied reference force is kept constant.

In one embodiment, the structure is connected to another structure and the force acting on at least part of the structure is exerted by the other structure on the structure. This embodiment can be employed to report forces in any biological system that can be mechanically coupled to the structure, e.g. coupled to a dsDNA linker molecule. Furthermore, this embodiment allows to investigate a mechanical response of the other structure.

This embodiment may further comprise controlling a force application system to apply a force to the other structure. Again, the force application system may be controlled based on a previously determined force. This embodiment thus provides a straightforward method for studying the mechanical response of the other structure, for example to study force-induced conformational changes (e.g. protein unfolding).

In one embodiment, the structure is at least partially positioned in a flow cell, and wherein the force acting on at least part of the structure comprises a drag force caused by a fluid flow.

In order to apply flow-stretch assays to study DNA-protein interactions, for example, it can be highly advantageous to quantify how tension varies along the length of a DNA substrate, for example because inhomogeneous tension can alter DNA-protein interactions or other reactions involving DNA. Often, however, it is either undesirable or impractical to tether a bead to the DNA. Tethering a bead to DNA constitutes an additional experimental step and may cause restrictions. There may be a risk of tethering too many DNA molecules to one bead. Furthermore, there may be a need to have two different labels on either end of DNA, which may be problematic if the range of DNA material for an experiment is limited. Typically in flow-based assays (e.g. DNA curtains), the DNA is tethered on both ends to a surface. In this case, it is physically impossible to tether a free end of the DNA to a bead. In other cases (e.g. hydrodynamic traps) DNA is free in solution and thus attaching a bead to the DNA may perturb the DNA's dynamics in the solution. In these cases, the force applied to the DNA can only be estimated based on its apparent extension. Even if it is possible to tether a bead to the structure in a flow-based assay, it is not trivial to measure a force with it due to angles and proximity surface and time resolution. This embodiment thus enables a straightforward and sensitive means to determine the drag force and/or a drag force profile on DNA in any flow-based assay.

In one embodiment, the structure is at least partially positioned in a holographic optical trap. This embodiment advantageously enables a simple method for determining a force on the structure when it is a holographic optical trap, for which known force measurement methods are less suitable.

In one embodiment, the optically active entities comprise at least one pair, preferably a plurality of pairs, of a donor fluorophore and an acceptor fluorophore. The at least one pair exhibits an emission spectrum that depends on the force acting on the structure, for example because the donor and acceptor entities are connected to a mechanical backbone, such as a DNA molecule which acts as a spring, i.e. it ensures that a force that is applied to the backbone causes the average distance between donor and acceptor moieties to increase or decrease with the applied force. In an example, a Förster resonance energy transfer (FRET) can occur between the donor and acceptor. This embodiment enables that the structure possesses intrinsic optical properties that are force-dependent. Furthermore, this embodiment enables to determine a force based on a color of the light coming from the structure. As known in the art, a DNA molecule can be synthesized using fluorescent base analogues of the standard nucleobases (A, G, C, T and U), which fluorescent base analogues can function as donor and acceptor fluorophores. By specifying a sequence of a DNA, the average distance between donor and acceptor bases can be tuned to optimize the force sensitivity and dynamic range of the probe.

One distinct aspect of this disclosure relates to a method for causing at least part of a structure to exhibit a force-dependent optical activity for enabling determination of a force acting on the at least part of the structure in accordance with one or more of the methods as described herein. This method comprises binding at least one pair of a donor fluorophore and acceptor fluorophore as described herein to the structure.

One embodiment relates to a method for determining a force acting on at least part of a DNA molecule. This embodiment comprises controlling an imaging system of a fluorescence microscope to determine light information based on fluorescent light from the structure. The fluorescent light is incident on at least a part of the imaging system. The at least part of the DNA molecule comprises one or more DNA intercalator molecules, wherein a quantity of the molecules bound to the DNA molecule depends on the force acting on the at least part of the DNA molecule and wherein the light information defines a light intensity value associated with said at least part of the DNA molecule. This embodiment further comprises determining the force acting on the at least part of the DNA molecule on the basis of said light intensity value and a reference light intensity value.

One embodiment relates to a method for causing at least part of a DNA molecule to exhibit a force dependent fluorescence for enabling determination of a force acting on the at least part of the DNA molecule in accordance with one or more of the methods for determining a force as described herein. The embodiment comprises combining the at least part of the DNA molecule with a fluid and fluorescent DNA intercalator molecules. The DNA intercalator molecules in the fluid can bind to the at least part of the DNA molecule. A binding property of the DNA intercalator molecules in respect of the at least part of the DNA molecule depends on the force acting on the at least part of the DNA molecule. Herein, preferably, also a fluorescence quantum yield of a DNA intercalator molecule depends on whether the DNA intercalator molecule is bound or unbound to the at least part of the DNA molecule, which yields a reduction of background light.

One aspect of this disclosure relates to a controller, wherein the controller is configured to perform one or more of the steps as described herein that relate to controlling the light-sensitive system and/or determining the force and/or controlling the force application system and/or determining one or more subsets of image pixel values and/or obtaining the parameter and/or any step that can be computer-implemented.

One distinct aspect of this disclosure relates to a computer program comprising instructions which, when the program is executed by a computer, cause the computer to carry out one or more of the steps of the methods as described herein.

One distinct aspect of this disclosure relates to a computer-readable storage medium comprising instructions which, when executed by a computer, cause the computer to carry out one or more of the method steps as described herein. As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing systems or be stored upon manufacturing of these systems.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1B:
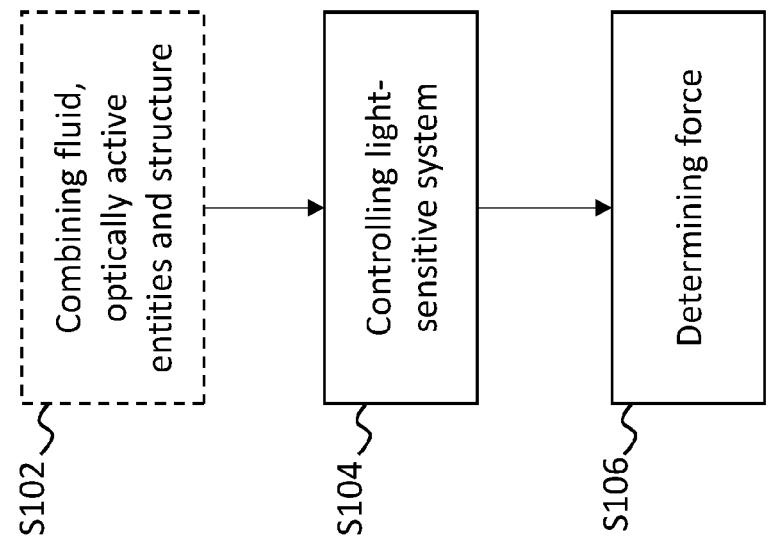
FIG. 1B depicts method steps according to one embodiment.
Figure 1A:
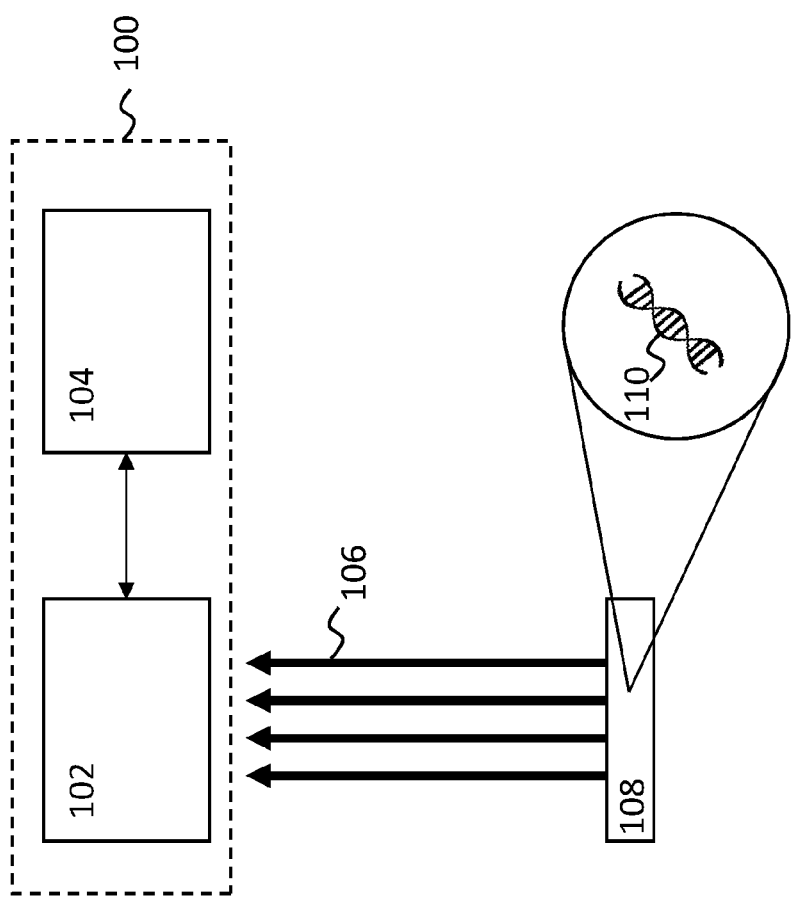
FIG. 1A depicts a system according to one embodiment.

FIG. 1A depicts a system 100 for determining a force acting on at least part of a structure 110. The structure may consist of and/or be a DNA molecule. The system 100 comprises a light sensitive system 102 and a controller 104 that is configured to control the system and perform one or more steps, for example steps S104, S106 and S106 described with reference to FIG. 1B. In this embodiment, the light sensitive system 102 is positioned such that a light-sensitive part of the system 102, e.g. an imaging plane, receives light 106 from the structure 110.

The light-sensitive system 102 may be part of a microscope, for example a fluorescence microscope. The microscope for example comprises a light source, such as a laser. The system may further comprise an optical system for directing light from the light source to the sample 108, in particular to the at least part of the structure 110. The light from the light source may excite the at least part of the structure, for example excite entities, e.g. fluorescent entities, bound to the at least part of the structure. As a result, the entities may emit light 106, e.g. fluorescent light. The system 100 may further comprise a second optical system for directing the light emitted by the entities to the light-sensitive system 102, which may be an imaging system 102, such as a CCD camera.

The structure 110 may thus be positioned in a sample or sample holder 108. The light 106 may be emitted by at least one of the structure 110 and the optically active entities bound to the structure 110 (not shown). However, the light 106 from the structure 110 may also be light that has passed through the structure. In the latter case, the optical activity of the optically active entities for example relates to an absorbance of or change in polarization of the incident light.

The structure 110, or at least part thereof, may exhibit a force dependent fluorescence in the sense that a higher or lower fluorescent light intensity emerges from the structure 110 when a larger force is acting on it.

In case a force acting on a part of the structure is determined, wherein the structure is a molecule, such as a DNA molecule, that part of the structure may be a free segment of the molecule. Herein, a free segment may be understood to be a part of the molecule that is adjacently connected only to one or more other parts of the same molecule (including the optically active entities), and not, for example, adjacently connected to a foreign structure. A foreign structure may be a bead to which the molecule is attached or may be another (DNA) molecule, for example one that is adjacently connected at a point where the two molecules are braided and/or fused. The method thus enables to obtain a force profile along a molecule, as opposed to one average force acting on a molecule, or part of a molecule, fixed between two foreign objects, for example two beads.

In one embodiment, the at least part of the structure comprises at least one pair, preferably a plurality of pairs, of a donor fluorophore and an acceptor fluorophore. As known, an occurrence of energy transfer between the donor and acceptor fluorophore, for example a Förster resonance energy transfer, may depend on a spatial distance between the donor fluorophore and the acceptor fluorophore. Further, the spatial distance between the donor fluorophore and the acceptor fluorophore may depend on the force acting on the at least part of the structure. An increasing force acting on the structure typically causes this distance to increase. The donor fluorophore may emit light comprising a first wavelength and the acceptor fluorophore may emit light comprising a second wavelength different from the first wavelength. In this embodiment, the light information may thus define a ratio between intensities of the first and second wavelength associated with the at least part of the structure and the force may be determined based on this ratio. In particular, this embodiment may comprise capturing a wavelength spectrum of light from the structure 110 and determining the force based on the spectrum. After all, the further apart the acceptor and donor are positioned, the lower the occurrence of energy transfer between the two will be and the more prominent the first wavelength may be present in the captured spectrum with respect to the second wavelength. This embodiment may comprise, during the force measurement, predominantly exciting the donor fluorophore with an excitation light source and to a lesser extent exciting the acceptor fluorophore with an excitation light source, e.g. not exciting the acceptor fluorophore. In an example, the donor fluorophore is a green light emitting entity and the acceptor fluorophore is a red light emitting entity. The pair of donor and acceptor then emit a spectrum that tends to contain higher green light intensities with respect to red light intensities as the force is increasing. In an example, the structure is a DNA molecule comprising, e.g. along its length, alternately positioned donor and acceptor fluorophores.

FIG. 1B illustrates a method according to one embodiment. Optionally this embodiment comprises the step S102. This step may serve to cause at least part of the structure 110 to exhibit a force-dependent optical activity, such as a force-dependent fluorescence. This may namely enable determination of a force acting on the at least part of the structure in the following steps S104-S106.

The force-dependent optical activity may relate to fluorescence as well as to phosphorescence, luminescence, absorbance, polarization change, or any other optical phenomenon.

Step S102 comprises combining the at least part of the structure with a fluid and optically active entities, for example in sample holder 108. Optically active may be understood to relate to at least one of fluorescence, phosphorescence, luminescence, absorbance or any other optical phenomenon. The optically active entities in the fluid can bind to the at least part of the structure 110. A binding property of the optically active entities in respect of the at least part of the structure 110 depends on the force acting on the at least part of the structure. The binding property in respect of the at least part of the structure may relate to an off-rate and/or on-rate binding constant in respect of the at least part of the structure and/or to a ratio between an off-rate and on-rate constant. The more optically active entities are bound to the at least part of the structure, the higher for example a light intensity may be of the light that emerges from the at least part of the structure.

Additionally or alternatively to the binding property, an optical property of optically active entities, such as the above-described pairs of donor and acceptor fluorophores, bound to the at least part of the structure 110 depends on the force acting on the at least part of the structure 110. An optical property may relate to a quantum yield and/or an intensity and/or color and/or polarization of light emitted/absorbed by the optically active entities. The optical property may relate to color of light in the sense that the optical property relates to a spectrum, e.g. an emission or an absorbance spectrum of light. The quantum yield may be defined for an optically active entity as the number of times a specific event, such as the emission of a photon, occurs per photon absorbed by the entity.

In one embodiment, the optically active entities comprise DNA intercalators, which may be understood to be planar molecules that bind reversibly between adjacent base-pairs of double-stranded (ds)DNA. A wide range of intercalator dyes are commercially available and their DNA-binding properties have been characterized. In particular, the entities may be cyanine dyes. Then, DNA-binding affinity may vary by 2-4 orders of magnitude over a force range of 0-60 pN.

In one embodiment, the fluorescent entities may comprise a labeled protein and/or molecule that exhibits force-dependent optical activity, for example PICH.

In one embodiment, the entities when unbound to the at least part of the structure exhibit a first optical activity and the entities when bound to the at least part of the structure exhibit a second optical activity that is different from the first optical activity. In case the optical activity relates to fluorescence, the first and second optical activity may relate to a first and second quantum yield respectively. Then, the second quantum yield may be 10-1000 times, preferably 500-1000 times, higher than the first quantum yield. Cyanine intercalator dyes, such as YO-PRO, YOYO-1, Sytox Orange and SYBR Gold, exhibit such enhanced fluorescence when intercalated. Enhanced fluorescence upon binding advantageously reduces background fluorescence because the amount of light captured by the light sensitive system from non-bound fluorescent entities is reduced with respect to the amount of light captured from fluorescent entities bound to the structure 110.

In one embodiment, the entities exhibit an off-rate with respect to the at least part of the structure of at least, which off-rate is equal to or larger than a rate at which events of a process under scrutiny occur. In an example, the process concerns the separation of two strands of a DNA molecule by a helicase repeatedly performing a step of separating at least one base pair at a time. Herein, the rate at which the event occurs may then relate to the number of times this separating step is performed per unit of time. The equilibrium binding constant may be defined as a ratio between an on-rate and the off-rate with respect to the at least part of the structure. The off-rate may be tuned through the choice of ionic strength of the fluid. This embodiment advantageously reduces perturbations of the structure and/or reduces perturbations of dynamic processes involving the structure, such as enzymes processing along DNA, because the entities only shortly bind to the at least part of the structure. The binding time may advantageously be (tuned to be) shorter than the characteristic time of the process under study in order to reduce perturbation of this process. The off-rate preferably is at least equal to, more preferably larger than, most preferably at least ten times larger than the rate at which the events of the process of interest occur. For example, if a polymerase steps at a rate of 100-1000 Hz, then it would be advantageous if the off-rate is larger than 1000 to 10000 Hz to leave each step relatively unperturbed. In another case, for example, where the average translocation rate of this polymerase would be of interest, then the average intercalator coverage is preferably considered to correct for the chance of encountering an intercalator. To illustrate, if a polymerase can on average travel ~10 bases before it encounters an intercalator, then the off-rate should be equal to or larger than the stepping rate of the polymerase for the impact of the intercalator on the rate to be less than ~10%.

In one embodiment, a fractional coverage of the at least part of the structure is lower than 50%. The structure may comprise binding sites at which the entities can bind. The fractional coverage may be defined as a ratio between a number of binding sites at which an entity is bound and a total number of binding sites. In case the entities referred to are intercalators, a coverage rate of 50% under moderate concentration and tension conditions corresponds to one intercalator for every 4 base-pairs of a DNA, because in such conditions, the footprint of an intercalator is 2 base pairs. Preferably, saturation is avoided because it may limit the dynamic range of fluorescence intensities, decrease the sensitivity of the force measurement, maximize any potential perturbation, and the low average intercalator spacing at or near saturation could enhance self-quenching of the fluorescence signal, which complicates force measurements by introducing non-linear contributions. This embodiment thus allows to measure the force over a large force range, e.g. (~1-65 pN), because non-linear effects due to saturation and/or due to high coverage fractions are prevented.

Step S104 comprises controlling the light-sensitive system 102 to determine light information based on light from the structure. The light-sensitive system 102 may be said to capture light when determining the light information and may be understood to comprise the light-sensitive system storing or transmitting information, e.g. image data, based on light that is incident on at least a part, e.g. an imaging plane, of the light-sensitive system 102.

The light information defines a light property value associated with said at least part of the structure 110. The light property value may be at least one of a light intensity value and a light color value and a light polarization value. A light intensity value associated with a part of the structure may indicate a radiant power of light from that part of the structure. A light color value may indicate a wavelength or a wavelength range of the light from a part of the structure and/or a light spectrum and/or a ratio of intensities between multiple distinct wavelengths of light from a part of the structure and a light polarization value may indicate a plane in which the electric field of the light from the structure substantially oscillates.

The light information determined by the light-sensitive system 102 may not comprise spatial information, for example may not define different light property values for respective parts of the structure 110. In order to perform such a bulk measurement, the light-sensitive system 102 only requires a single pixel or large area detector. In one example, the structure of interest 110 is a is a DNA containing structure (eg pre-stressed DNA origami structure), at least partially positioned in a fluorometer.

The light sensitive-system optionally comprises an imaging system that may comprise a plurality of pixels. Furthermore, the light information may comprise image data that may be spatially resolved, for example in the sense that the image data define a plurality of light property values associated with respective parts of the structure. In such case, the image data may also be understood to define a single light property value for the collection of these parts in the sense that the image data define an average light property value, wherein the average light property value may be an average of the plurality of light property values in the image data. Obtaining such an average light property value may comprise integrating said plurality of light property values.

Step S106 comprises, based on said light property value and on a reference light property value, determining the force acting on the at least part of the structure 110. The force may be determined in the sense that a magnitude and/or direction of the force is determined. In case the magnitude of the force is measured, the magnitude may be understood to be the size of a force component acting in a specific direction, such as a direction along a length of the structure 110.

In one embodiment the method comprises obtaining a parameter relating a difference of force magnitude to a difference in optical property value and determining the force acting on the at least part of the structure based on said parameter. In an example, a first force is acting on a first part of the structure and a larger second force is acting on a second part of the structure. In this example, the image data may define a first light intensity value for the first part and define a higher second light intensity value for the second part. Based on the obtained parameter, and based on the difference between the first and second light intensity value, a difference between the first and second force may be determined. In this example, the method comprises determining the second force in the sense that the method comprises quantifying how much larger the second force is with respect to the first force. Herein, the first force may be unknown.

Figure 2B:
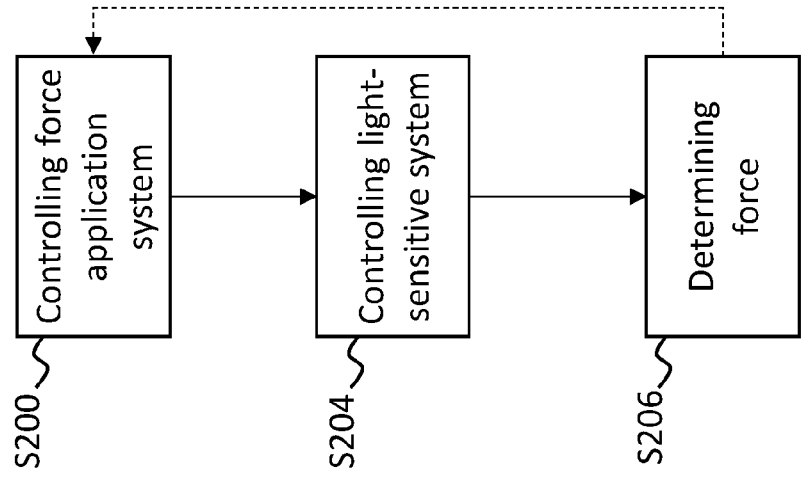
FIG. 2B depicts a method according to an embodiment comprising controlling the force application system.
Figure 2A:
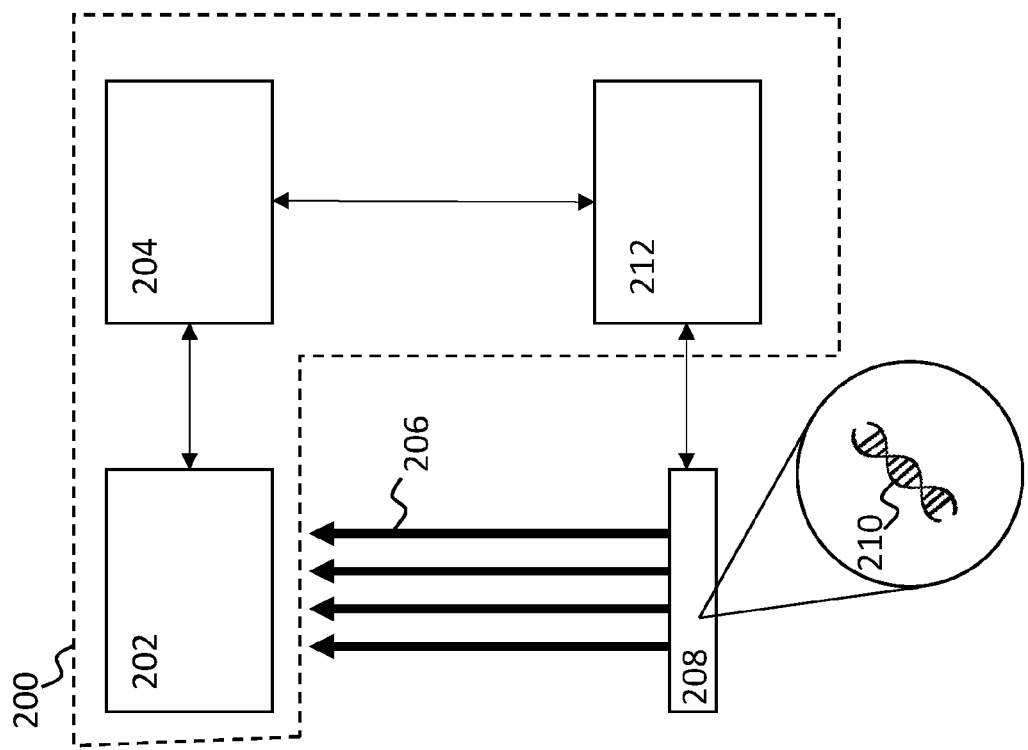
FIG. 2A depicts an embodiment of the system comprising a force application system.

FIG. 2A depicts an embodiment of the system wherein the system 200 comprises a force application system 212 and FIG. 2B illustrates an embodiment comprising the step S200 of controlling the force application system 212 to apply a force to the at least part of the structure 210. In this disclosure, number indices in the figures that differ by hundred folds indicate similar, e.g. identical, components. It should be appreciated that step S200 may be performed based on a force that was previously determined as indicated by the dashed line in FIG. 2B. This feedback-loop enables to accurately apply forces to the at least part of the structure 212.

The force application system 212 may comprise a system for establishing a trap, such as an optical trap, such as a holographic optical trap, acoustical trap and electrical trap such as an Anti-Brownian Electrokinetic trap. It may also comprise a system for creating acoustical standing waves in order to attract objects to the nodes of this standing wave and thereby apply forces on the objects. The structure 210 may be connected to at least one bead that sits in such trap established by system 212. In an example, the structure 210 is connected to two trapped beads. In these cases, step S200 may comprise controlling the relative positions of the traps holding the beads. It should be understood that the force application system 212 may be any kind of system that can cause a force or a change of force acting on the at least part of the structure. An example of a force application system would thus be a manipulation system for deforming the at least part of the structure.

The structure 210 may be at least partially positioned in a flow cell 208. The force application system 212 may then comprise the flow cell 208 (not shown). Furthermore, step S200 may in such case comprise controlling at least one of a fluid flow and a solution of a fluid in the flow cell 208, for example to control a drag force acting on the at least part of the structure. The solution of the fluid may be controlled in the sense that the ionic strength of the solution is controlled.

In one embodiment, step S200 comprises controlling the force application system 212 to change the force acting on the at least part of the structure 210. A change of the force may be achieved by a change of position of acoustical/optical/electrical traps relative to each other. A change of force may be achieved by varying the amplitude or wavelength of an acoustic standing wave. A change of the force may be achieved by changing at least one of a fluid flow and a solution of the fluid.

Step S204 may comprise controlling the light-sensitive system to capture light from the structure while said force is changing. The light information defines, for a plurality of time instances, a light property value associated with said at least part of the structure 210. Furthermore, step S206 may comprise, for each time instance, based on the light property value, determining the force acting on the at least part of the structure. It should be appreciated that the step of controlling the force application system to change the force acting on the at least part of the structure may be performed based on an initial determination of the force in accordance with the methods described herein as depicted by the dashed line.

With reference to FIG. 3 it is noted that in one embodiment the method comprises controlling the light-sensitive system to determine reference light information based on reference light from a reference structure while a reference force is acting on at least a part of the reference structure. In this embodiment, the at least part of the reference structure exhibits a force-dependent optical activity. The reference light information defines a reference light property value associated with said at least part of the reference structure.

Preferably, for the at least part of the reference structure the dependence of the optical activity on force is similar, e.g. the same, as for the at least part of the structure.

In this disclosure, reference forces may be applied to the structure using a force application system as described herein. Optionally such force application system is calibrated which allows to apply known forces to the reference structure. In an example, the structure is tethered to a bead, which bead may be trapped, for example in an optical or acoustical trap.

The application of reference forces does not require the use of calibrated traps. In one example, a reference force of zero is applied, which may be established by removing or minimizing the mechanical perturbation to the structure. In another example, the embodiment comprises determining the reference force based on one or more observed events associated with one or more forces. To illustrate, in case the structure is a DNA molecule it is known that, in the presence of intercalators, the onset of DNA overstretching typically occurs between 65 and 70 pN. Hence, when the imaging system captures the reference fluorescent light from the structure at the moment the DNA starts to overstretch, the reference light property value as defined by the light information can be associated with 65-70 pN, which allows calibration for measuring absolute forces. In yet another example, the optically active entities may become active when a force acting on the at least part of the structure exceeds a threshold force. Then, the determined light property value at the moment the optically active entities become active can be associated with the threshold force.

Figures 3A, 3B:
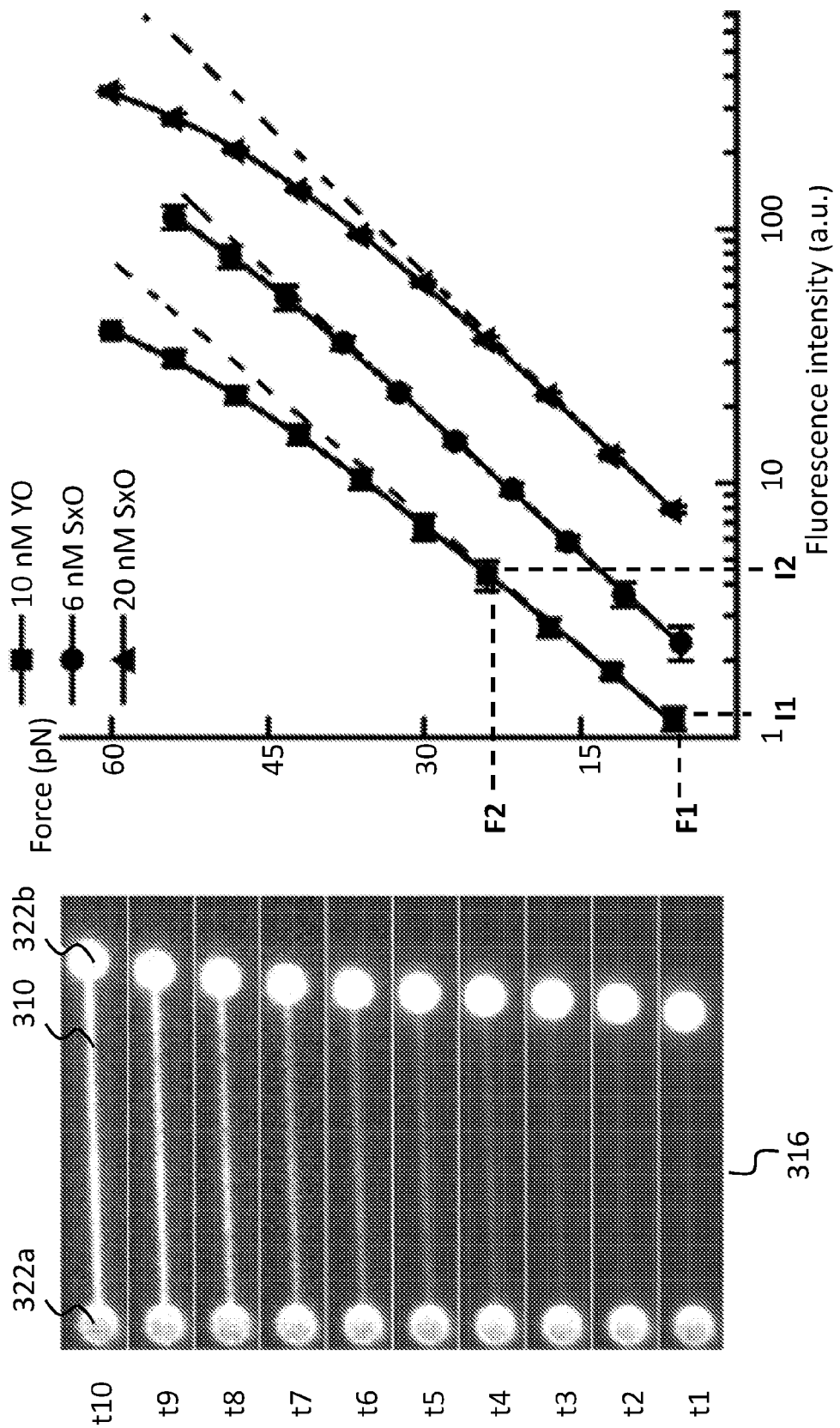
FIG. 3A visualizes obtained image data according to an embodiment.
FIG. 3B illustrates calibration results according to one embodiment.

FIG. 3A visualizes reference light information, in particular reference image data 316, that defines for a plurality of time instances t1-t10 an average light intensity value for a single DNA molecule 310. At a time t1 a reference force F1 of approximately 7 pN is applied to the DNA molecule 310, in this example the reference structure, by controlling the relative positions of two calibrated optical traps 322a and 322b holding beads. The vertical axis of the graph 3B shows force values and the horizontal axis shows light property values, in this case fluorescence light intensity values, that are associated with the DNA molecule 310. An imaging system has thus determined, based on reference light from the DNA molecule 310, which reference light was captured while the reference force F1 was applied to the DNA molecule 310, reference image data 316 defining a reference property value I1. Therefore, graph 3B shows point (I1,F1). The processor may store the reference property value I1 in association with reference force F1.

If both the above-described parameter has been obtained as well as the reference light property value I1 in association with a known reference force F1, then the absolute force F2 acting on the at least part of the structure may be determined based on I2. Herein, the following relation may be used $$F2 = \phi \ln\left(\frac{I_2}{I_1}\right) - F1. \quad (1)$$

I2 denotes the light property value as defined by the light information determined by the light-sensitive system and φ said parameter.

In case the above-described parameter has been obtained as well as the reference light property value I1, wherein the reference light property value is associated with an unknown reference force, then, a force difference between the unknown reference force and the force acting on the at least part of the structure may be determined, for example based on the relation $$\Delta F = \phi \ln\left(\frac{I_2}{I_1}\right). \quad (2)$$

It should be appreciated that a difference may relate to a subtraction and/or to a ratio. To illustrate, the parameter may be the parameter φ as per above, which relates a difference in force to a difference in light intensity value, wherein the force difference relates to a subtraction and the intensity difference is expressed as a ratio between $I_2$ and $I_1$. A force increase of $\Delta F = F2 - F1$ causes an intensity increases by a factor of $e^{\Delta F/\phi}$.

Yet a further embodiment comprises controlling the light sensitive system to determine second reference light information based on second reference light from a second reference structure while a second reference force is acting on at least a part of the second reference structure. The second reference light information defines a second reference light property value associated with said at least part of the second reference structure. This embodiment further comprises determining the force acting on the at least part of the structure based on the second reference light property value. In the example shown in FIG. 3, the reference structure 310 is the same structure as the second reference structure. FIG. 3B shows that at a time t4 a second reference force F2 of approximately 25 pN was applied to the DNA molecule 310. Furthermore, the second reference light information defines a second reference light property value of I2 for the second reference force F2.

Based on the reference light property value I1 associated with the reference force F1 and the second reference light property value I2 associated with the second reference force F2, the parameter relating the parameter relating a difference of force magnitude to a difference in optical property value may be determined. This embodiment thus enables to independently determine this parameter.

In particular, FIG. 3A presents snapshots of fluorescence images recorded for a dsDNA molecule (~48.5 kb) under increasing tension in the presence of the cyanine dye YO-PRO (YO) (10 nM). A clear increase in fluorescence intensity is observed as the applied force is raised. This trend is quantified in FIG. 3B for cyanine dye YO at 10 nM concentration and for Sytox Orange (SxO) for 6 and for 20 nM concentration. In order to accurately describe the relationship between intercalator fluorescence and dsDNA tension, it is noted that the equilibrium binding constant (K) of an intercalator depends on the force (F) applied to the DNA molecule:

$$K(F) = K_0 e^{\frac{F}{\phi}} \quad (3)$$

Here, $K_0$ is the binding affinity of the intercalator for dsDNA at 0 pN and φ is a characteristic force equal to $k_B T/\Delta x_{eq}$, where $\Delta x_{eq}$ represents the equilibrium average elongation per base-pair due to the presence of an intercalator dye. The equilibrium average elongation per base-pair due to the presence of an intercalator dye for mono-intercalators is approximately 0.34 nanometer (corresponding to 12 pN) and for bis-intercalators approximately 0.68 nanometer (corresponding to 6 pN). Equation 3 results from the fact that an applied force lowers the net free energy cost associated with the increased DNA extension upon intercalation. Further, it is known that the equilibrium binding constant can be related to both the concentration of intercalator [I] and the fractional dye coverage $\vartheta$ as follows:

$$K = \frac{1}{n[I]} \frac{\vartheta}{(1-\vartheta)} \quad (4)$$

where n is the footprint of the intercalator in base-pairs, and $\vartheta$ varies between 0 and 1. Whereas equation (4) is based on a multiligand binding isotherm, other binding isotherms may be used that are appropriate for certain substrate-ligand interactions. One such isotherm that is often used for DNA-binding ligands is the McGhee von Hippel isotherm as per J. D. McGhee and P. H. von Hippel, J. Mol. Biol. (1976) 103, 679. In addition, it has also been established that: (i) the elongation of dsDNA due to the binding of cyanine dye intercalators scales linearly with the fluorescence intensity; and (ii) dsDNA elongation is directly proportional to $\vartheta$. Extrapolating the above laws it can be derived that the total (background-corrected) intercalator fluorescence intensity ($I_F$) is related to the applied force on dsDNA by the following expression:

$$F = -\phi \ln\left[\frac{B}{I_F}(I_{max} - I_F)\right] \quad (5)$$

$I_{max}$ (the maximum background-corrected fluorescence intensity at saturated coverage) and B are parameters defined as follows.

$$I_{max} = \frac{I_n N_{bp}}{n} \quad (6)$$

and $$B = nK_0[I] \quad (7)$$

wherein $I_n$ is the background-corrected fluorescence intensity of a single intercalator dye, $N_{bp}$ is the number of base-pairs in the DNA molecule.

Fitting the data in FIG. 3B to Eqn. 5 (solid lines) provides an excellent match over the full range of forces considered (0-60 pN). Hence, the step of determining the force acting on the at least part of the structure may be performed based on a relation defined by Equation 5.

$\phi$ may be determined by plotting the elongation in dsDNA length due to the binding of intercalators against the number of intercalated molecules. A linear fit to this plot yields $\Delta x_{eq}$, from which $\phi$ can then be calculated.

In order to extract $I_{max}$ and B, two alternative methods may be employed. In the first method, the assertion is made that $I_{max}$ and B can be expressed via the following two equations:

$$I_{max} = I_F\left(1 + \frac{e^{-F/\phi}}{B}\right) \quad (8)$$

$$B = \frac{I_F e^{-F/\phi}}{I_{max} - I_F} \quad (9)$$

Assuming two reference force values are known, denoted here as $F_1$ and $F_2$ (with corresponding fluorescence intensity values $I_1$ and $I_2$), the following may be derived:

$$I_{max} = I_{F1}\left(1 - \frac{e^{-F_1/\phi}}{e^{-F_2/\phi}}\right)\left(1 - \frac{I_{F1}}{I_{F2}} \frac{e^{-F_1/\phi}}{e^{-F_2/\phi}}\right)^{-1} \quad (10)$$

By inserting the known reference forces (along with their measured fluorescence intensities) into Eqn. 10, $I_{max}$ can be calculated. The magnitude of B can then be determined by inserting this value of $I_{max}$ into Eqn. 9. The reference forces may be:(i) 0 pN, which can be established by removing or minimizing the mechanical perturbation to the dsDNA; and (ii) the onset of dsDNA overstretching, which typically occurs at 70±3 pN in the presence of intercalators.

In the second method, Imax and B are determined from a fit of Eqn. 5 using either:(i) two reference force values (along with their corresponding fluorescence intensities) at a constant intercalator concentration, or (ii) two reference intercalator concentrations (along with the associated fluorescence intensities) at a constant known force.

The fluorescence intensity increases mono-exponentially with applied force when the dye coverage is far from saturation (i.e. at low force ranges and/or at lower dye concentrations). $\vartheta$ is then namely proportional to K (see equation 1). On the basis of this, any change in applied force ($\Delta F = F_2 - F_1$) can be determined simply by using the following relation:

$$\Delta F = \phi \ln\left(\frac{I_2}{I_1}\right) \quad (2)$$

where $I_i$ is the background-corrected fluorescence intensity at $F_i$. In this case, the absolute value of an unknown force (say $F_2$) can then be calculated by comparing the fluorescence intensity at this force with that at a known reference force ($F_1$). A useful reference force here could be 0 pN. The dashed lines in FIG. 3B confirm that, indeed, a mono-exponential fit describes the measured data well under low coverage conditions (i.e. up to ~45 pN at this dye concentration).

One embodiment comprises determining that the intercalator coverage is far from saturation. This embodiment comprises controlling a force application system to apply a known force to the structure, e.g. DNA, while the fluorescence intensity is measured at increasing intercalator concentrations, [I]. A plot of fluorescence intensity versus [I] will be linear until levelling off at higher [I] due to saturation (Eqn. 5). The concentration range over which intercalated dsDNA is out of saturation can then be estimated from the linear region of this curve. Note that saturation will occur at lower intercalator concentrations as the applied force is increased. It is therefore preferable to perform this saturation test at the highest force expected during experiments. A more approximate, but simpler, approach is to measure the fluorescence intensity at a plurality of intercalator concentrations while maintaining the structure at a fixed force. If the fluorescence intensity increases by the same factor as does the intercalator concentration, it can be assumed, to a first approximation, that the dye coverage is far from saturation.

The force resolution of this method depends on the signal-to-noise ratio associated with the fluorescence images. When for example the fluorescence signal from YO (10 nM) for each pixel (130 nm) of an imaging system is captured over a time interval between 3 and 17 seconds, at forces between 60 and 6 pN, a force resolution may be achieved in the range of 1-3 pN.

With reference to FIG. 4 it is noted that in one embodiment, the light-sensitive system comprises an imaging system. In this embodiment, the light information comprises image data, wherein the image data define, for a plurality of time instances t1-t8, a set of light property values associated with respective parts of the structure. This embodiment comprises the step of, for each part, based on its associated light property value, determining a force acting on the part of the structure.

Figure 4B:
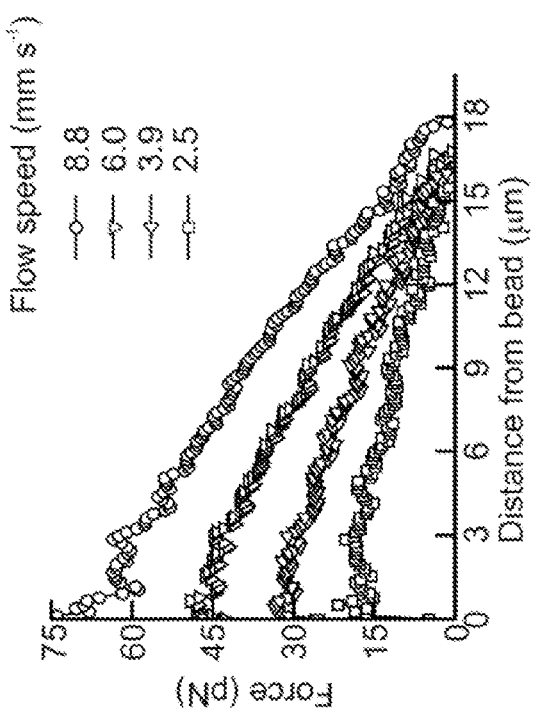
FIGS. 4B and 4C illustrate force measurement results according to one embodiment.
Figure 4C:
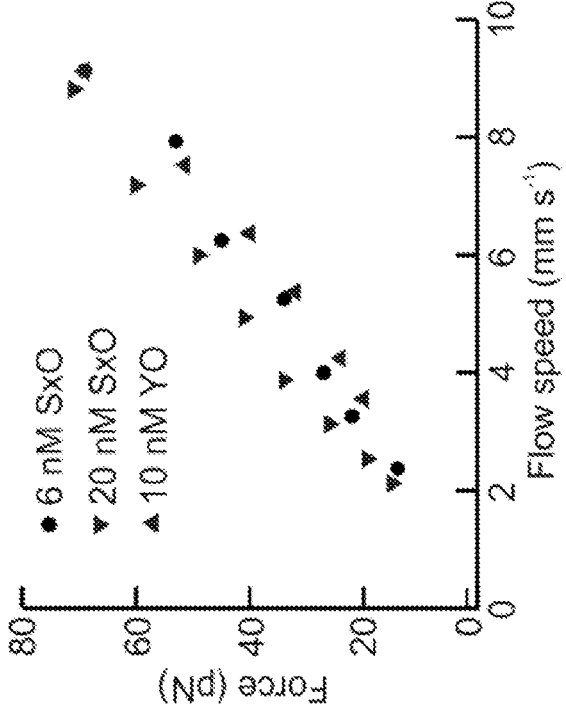
Figure 4A:
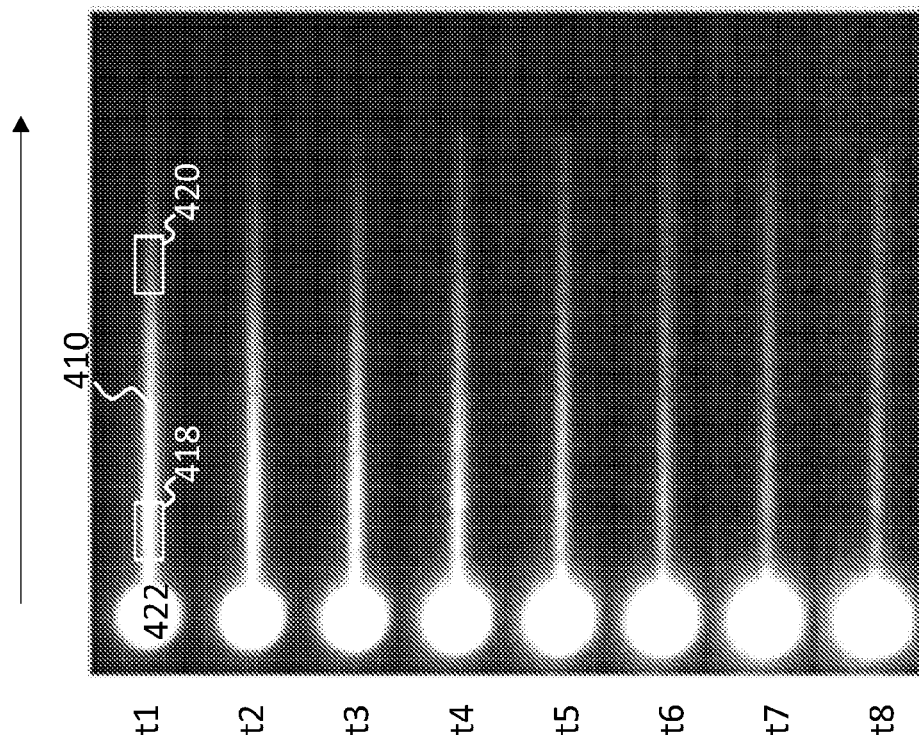
FIG. 4A visualizes image data according to one embodiment.

FIG. 4 shows image data 416 that may be obtained in case the light-sensitive system comprises an imaging system and the light information comprises image data. Herein, the structure 410 is at least partially positioned in a flow cell and the force acting on at least part of the structure comprises a drag force caused by a fluid flow. FIG. 4A shows a DNA molecule 410 that is tethered on one end to an optically-trapped bead 422. The DNA molecule 410 is stretched by a hydrodynamic flow indicated by the arrow. The image data 416 define a set of light property values associated with respective parts of the structure 410. In FIG. 4A, the image data 416 define a first light property value, e.g. an average recorded intensity, associated with part 418 of the structure 410 and define a second light property value associated with part 420 of the structure.

A maximum dimension of the respective parts for example is smaller than 5000 nanometer, preferably smaller than 2000 nanometer, more preferably smaller than 500 nanometer.

In principle, the spatial resolution with which forces can be resolved is the spatial resolution of the microscopy technique applied. The smallest part than can be resolved using standard optical microscopy is approximately ½ times the wavelength of excitation/detection light, i.e. approximately 200-300 nm. For example, with STED the smallest part can in principle be arbitrary small but in practice parts of approximately 20 nm can be resolved. Using localization techniques small parts of approximately 5 nm can be resolved.

The imaging system may determine the image data in parallel. In an example, the imaging system comprises a plurality of pixels. Each pixel may receive light from a respective part of the structure. A pixel may thus perform the step of determining light information based on light from an associated part of the structure. The pixels may simultaneously perform this step. Thus the imaging system may image the respective parts of the structure at once.

It should be appreciated that the image data 416 may represent an image of the at least part of the structure 410 and comprises a set of image pixel values associated with respective parts of the structure. Furthermore, the method may comprise determining one or more subsets of one or more image pixel values, for example the image pixel values of the image pixels within area 418 indicated in the image. Each subset defines a region of interest (ROI) 418 in the image. For each ROI, the force acting on a part of the structure represented by the ROI 418 may be determined based on the image pixel values defining the ROI 418.

FIG. 4B shows that, in case the imaging system is controlled to capture light from the at least part of the structure 410 while the force acting on the at least part of the structure is changing, the image data 416 may define, for a plurality of time instances t1-t8, a set of light property values associated with respective parts of the structure. This allows to monitor changing forces acting on a plurality of parts of the structures.

In particular, FIG. 4 shows experiments wherein a lambda-DNA molecule, tethered on one end to an optically-trapped bead (1.84 micrometer diameter), was stretched via hydrodynamic flow (arrow) in the presence of intercalator dye. FIG. 4A displays sample fluorescence images obtained as the DNA is stretched using different flow speeds in the presence of SxO (20 nM). FIG. 4B shows tension along the length of the DNA molecule shown in FIG. 4A, in this example as a function of flow speed. The tension over the different segments of the DNA was derived using Eqn. 5. The flow speed was calculated using Stokes' law. FIG. 4C shows a comparison of the maximum drag force, near the tethered end of the dsDNA molecule (calculated using Eqn. 5), as a function of flow speed for two different dyes: YO (10 nM) and SxO (6 nM, 20 nM). Data were obtained in a buffer containing 20 mM HEPES pH 7.5, 100/150 mM NaCl, 2/10 mM MgCl2, 0.02% casein and 0.05% Pluronics F127 for YO/SxO studies, respectively.

Figure 5:
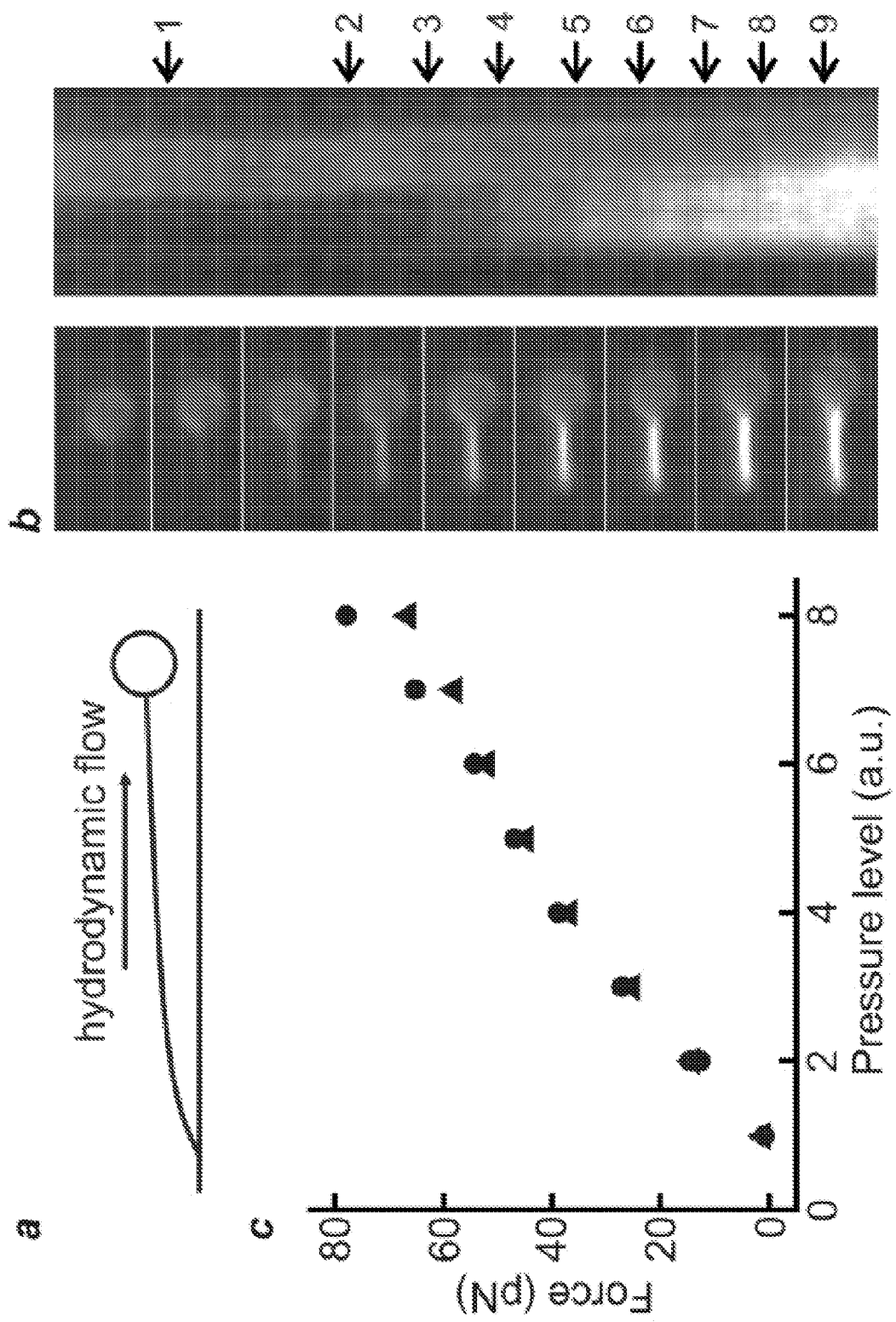
FIG. 5 illustrates set-up and results of a force measurement according to an embodiment.

FIG. 5A illustrates an experimental scheme according to one embodiment, wherein a dsDNA molecule (~8.6 kb) is tethered between the surface of a flow-cell and a bead of 1.84 micrometer diameter. The DNA molecule is stretched using hydrodynamic flow. FIG. 5B shows sample fluorescence images of a flow-stretched dsDNA molecule in the presence of SxO (20 nM) as the shear flow is increased (frames 1-9). FIG. 5C shows an average DNA drag force as a function of shear flow. The drag force was calculated using Eqn. 5, while the shear flow was tuned through the pressure applied to the reservoir containing the intercalator solution. Note that black circular data points correspond to the snapshots in FIG. 5B, while triangular data points are derived from fluorescence images of a second surface-tethered DNA molecule. Data were obtained in a buffer containing 20 mM HEPES pH 7.5, 150 mM NaCl, 10 mM MgCl2, 0.05% casein and 0.1% Pluronics F127.

Figure 6:
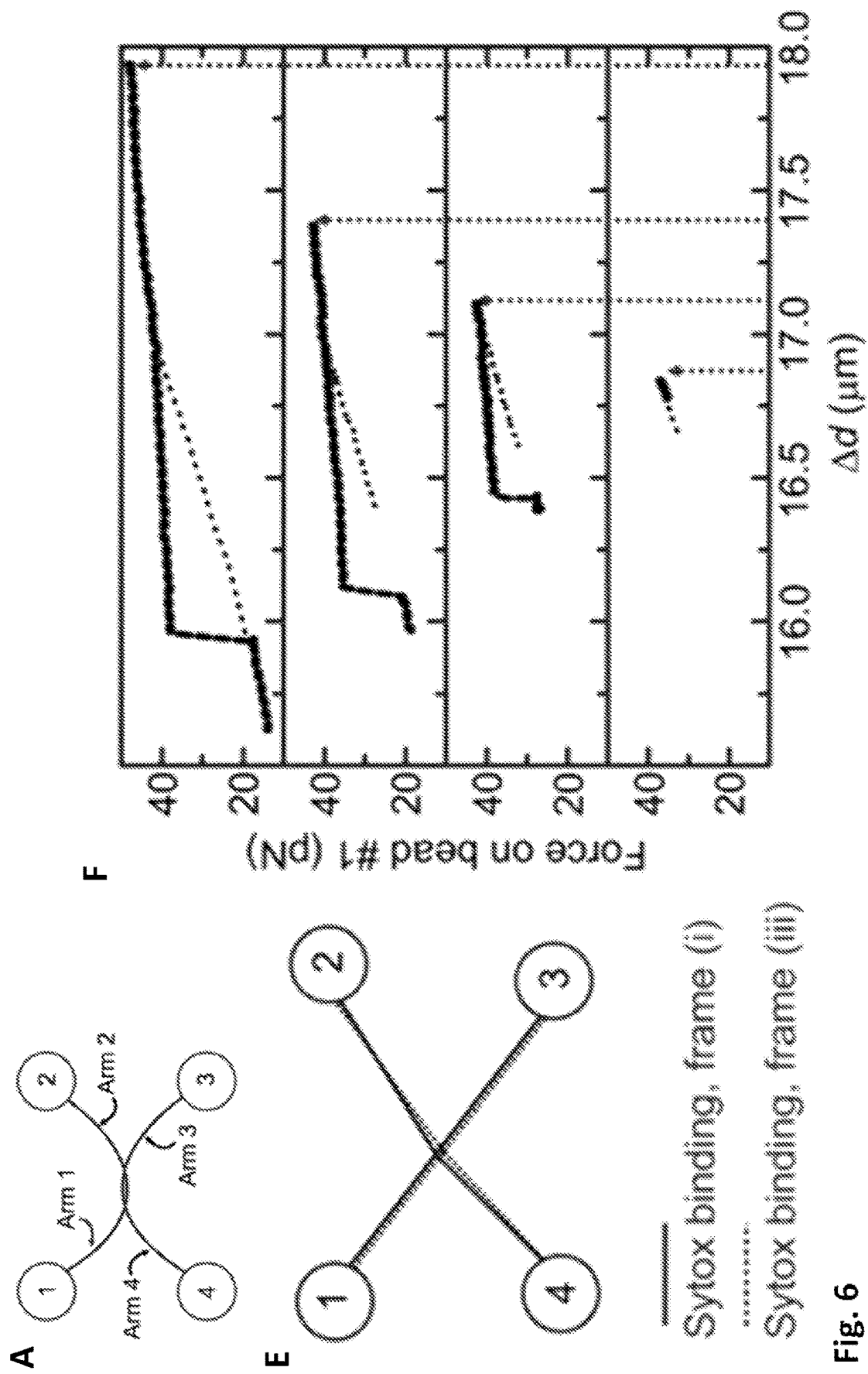
FIG. 6 illustrates set-up and results of a force measurement according to an embodiment.
Figure 6:
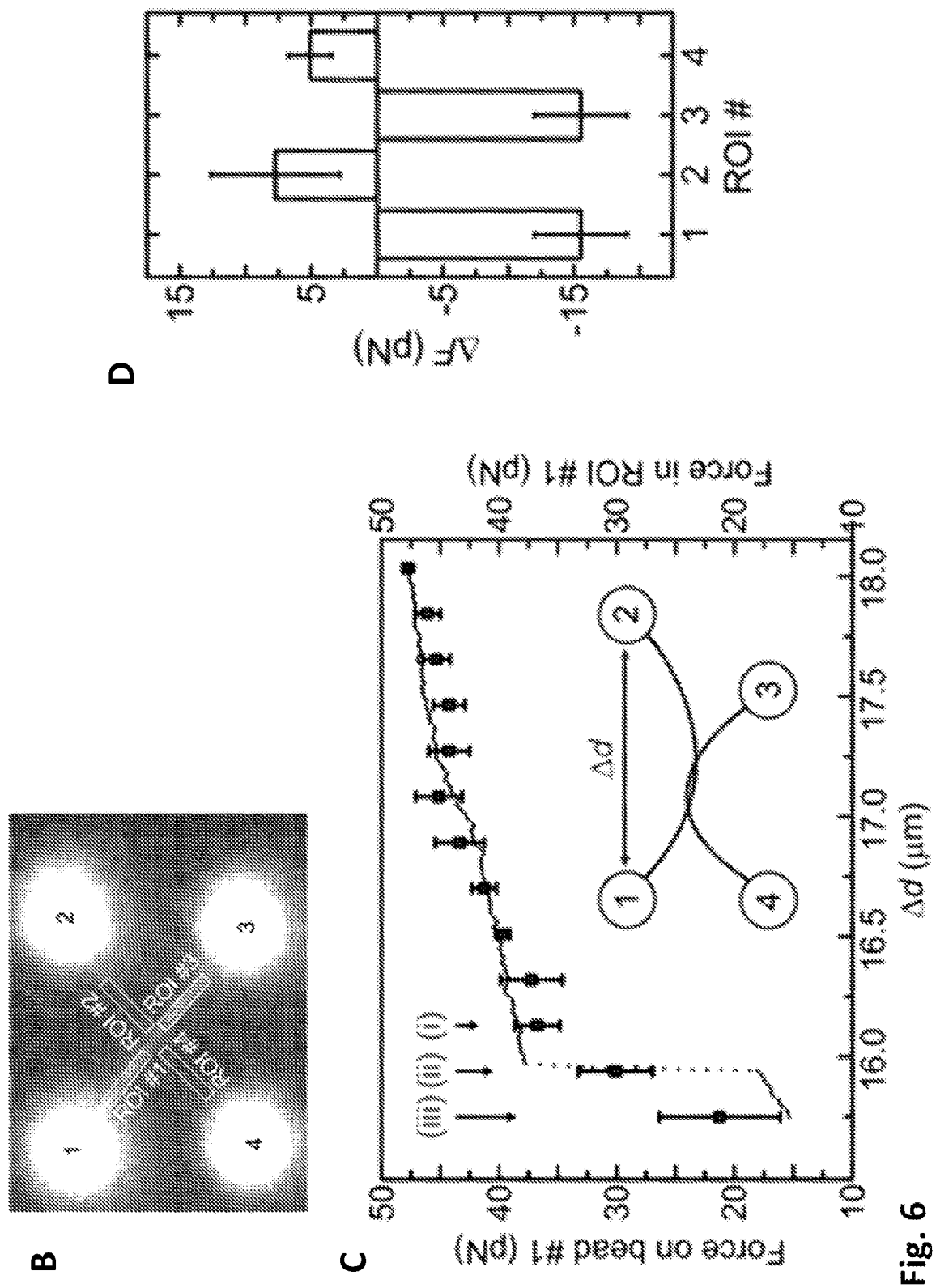

With reference to FIG. 6, it is noted that in one embodiment, the structure comprises at least one DNA molecule that is connected to (e.g. through covalent bonds, electrostatic or other attractive interactions or topologically by e.g. braiding) a second molecule, for example a second DNA molecule. More complex tension patterns and mechanically ordered structures (e.g. chromosomes) can often arise in two-dimensional or three-dimensional molecular architectures, as commonly encountered in living systems. One such example involves the entanglement of multiple DNA molecules or compacted chromosomes. The study of entwined DNA is of considerable interest from both a physical and biological perspective. It has recently been discovered, for instance, that stretched and entwined dsDNA tracts are generated regularly in vivo during chromosome segregation through the formation of so-called ultra-fine DNA bridges. This embodiment advantageously enables to measure how forces are partitioned within multi-component DNA complexes.

FIG. 6 illustrates that the methods disclosed herein may be used to measure the force response of two entwined dsDNA molecules as they are placed under tensile strain. To generate entangled DNA, a 4-way optical trap may be used to manipulate two dsDNA molecules, each one held between a set of two optically-trapped beads. By translating the beads in 3-dimensions, one dsDNA molecule may be wrapped once around the other to create an entwined dual dsDNA structure consisting of four 'arms'. Each arm may be tethered to a different bead (numbered 1-4), as illustrated in FIG.

6A. The entwined DNA assembly may be incubated in SxO (20 nM) and the fluorescence within a region of interest (ROI) along each arm of the DNA structure may be imaged. Following this, tensile strain may be applied to the entwined DNA structure by first increasing, and then decreasing, the distance between bead #1 and bead #2 (delta d), shown schematically in FIG. 6C. From the change in fluorescence intensity within ROI #1, Eqn. 4 may be used to measure the reduction in tension within arm #1 as $\Delta d$ is decreased (following its initial extension). The results of this are shown in FIG. 4C (circular data points). Note that the absolute force was calibrated with reference to the thermal fluctuations of bead #1 in the optical trap, determined using back-focal plane interferometry (shown as a line in FIG. 4c). Together, these data (which show good agreement) reveal that an abrupt, and unexpected, drop in force occurs as $\Delta d$ is decreased.

In order to understand the nature of this sudden decrease in force, intercalator fluorescence alone may be used to extract the change in force on all four dsDNA arms. The lower panel of FIG. 4C compares the fluorescence images recorded before (i), during (ii) and after (iii) the abrupt change in force identified above. FIG. 4D quantifies the change in tension within each arm of the entwined DNA complex between frames (i) and (iii), using Eqn. 4 and based on the corresponding change in fluorescence intensity within ROI #1-4, respectively. This analysis reveals that a sudden reduction in force of ~15 pN in fact occurs along both arms #1 and #3, while an increase in force of ~5-10 pN is detected along both arms #2 and #4. Thus, using intercalator fluorescence as a force probe, it may be confirmed that a substantial and abrupt rearrangement in tension occurs along each 'diagonal' component of the entangled DNA complex as $\Delta d$ is decreased. An additional—and complementary—advantage of the use of cyanine fluorescence is that it can easily correlate rearrangements in force with changes in DNA geometry. With this in mind, FIG. 6E compares the location of the intersection point of the two entwined dsDNA molecules before and after the force jump identified in FIGS. 6C and 6D. From this, it may be determined that, at the moment of the force rearrangement, the intersection point shifts by ~500±100 nm.

This example highlights how intercalator fluorescence can be exploited to quantify, in remarkable detail, the redistribution of local forces within complex DNA architectures. For instance, using the methods as disclosed herein, also stick-slip dynamics when sliding one entwined DNA molecule through another may be detected and measured.

While the light-sensitive system is capturing light from the structure, the structure may be positioned in a buffer containing 20 mM HEPES pH 7.5, 100/150 mM NaCl, 2/10 mM MgCl2, 0.02-0.05% casein and 0.05-0.1% Pluronics F127 for YO/SxO studies, respectively. Alternatively, the structure may be positioned in a buffer of 20 mM Tris-HCl pH 7.5 and 50 mM NaCl. Stock solutions of intercalators (YO and SxO) may be prepared in dimethylsulphoxide (DMSO) and stored at −20 degrees Celsius. Prior to performing force measurements, intercalator solutions may be diluted with buffer (with DMSO constituting less than 2% v/v). The structure may be bacteriophage lambda DNA (~48.5 kb). In surface-based flow-stretch assays, a shorter DNA construct may be employed (derived from a linearized PKYB-1 plasmid, ~8.6 kb).

The light-sensitive system may be part of an inverted wide-field fluorescence microscopy. Furthermore, dual-trap optical tweezers may be used. The force measurements may be performed in a multi-channel laminar flow-cell where lambda-DNA is tethered between two microspheres (of diameter 1.84 micrometer) in situ. Such a flow-cell allows this dumbbell construct to be exchanged rapidly between channels containing different buffer conditions or intercalator dyes. Forces applied to the lambda-DNA (via displacement of a tethered microsphere) may be measured independently via back-focal plane interferometry of the condenser top lens using a position-sensitive detector. Fluorescence from DNA intercalators may be induced with either a 491 nm excitation laser (YO) or a 532 nm excitation source (SxO). The resulting fluorescence may be imaged using an EMCCD camera as light sensitive-system.

For a surface-based DNA flow-stretch assay, DNA molecules (~8.6 kb) may be tethered between a microsphere and a glass surface using a protocol modified from a standard procedure. A custom-made glass flow-cell with an interior channel of dimensions 8000×2000×100 µm may be connected, via a tubing system, to a reservoir inside a pressure box. The surface of the flow-cell may first be coated with Anti-Digoxigenin (ADig) antibodies in PBS (0.02 mg/ml) for 30 minutes. After rinsing with PBS, the surface may be incubated sequentially with BSA (2 mg/ml), then Pluronics F127 (5 mg/ml), each in PBS. Surface-tethered DNA may be generated by incubating the DNA (10 pM in PBS, pre-labelled with Biotin/Digoxigenin on opposite ends) in the flow-cell for 20 minutes, before blocking residual ADigs with a solution of digoxigenylated casein in PBS (0.05 mg/ml) for 30 minutes. Following this, the surface-tethered DNA may be incubated with 25 microliter of a 0.1% suspension of streptavidin-coated microspheres (1.84 µm diameter) in PBS (containing 0.02% of both casein and Tween 20) for 30 minutes. Untethered microspheres may then be flushed out of the flow-cell with the measurement buffer (20 mM HEPES pH 7.5, 150 mM NaCl, 10 mM MgCl2, 0.05% casein and 0.1% Pluronics F127). Note that the hydrodynamic flow rate is lower near the surface of a flow-cell than in the centre due to the meniscus effect; when flow-stretching a surface-tethered DNA, the force applied to the DNA will therefore be lower near the tethering point. For this reason, fluorescence intensity may be measured in a region of interest away from the surface-tethered end of the DNA (where the molecule can be considered near parallel to the surface).

For combined 4-way optical trapping and fluorescence microscopy, the output of a 1064 nm fibre laser may be split into four paths which may then be used to generate four optical traps within an inverted microscope. The methods for force measurements may be performed in a multi-channel flow-cell where two dumbbell constructs are constructed in situ, each composed of a lambda-DNA molecule tethered between two microspheres (of diameter 3.5 micrometer). Entwinement of two DNA molecules may be achieved by displacing two of the four microspheres in 3-dimensions.

The microscope of which the light-sensitive system may be part may be a custom-built inverted microscope that combines wide-field fluorescence microscopy and dual-trap optical tweezers. A 1,064-nm fibre laser (YLR-10-LP, 10 W, IPG Photonics) and a water-immersion objective (Plan Apo 60, numerical aperture 1.2, Nikon) may be used to create two orthogonally polarized optical traps. The trap separation may be controlled using a piezo mirror (Nano-MTA2X Aluminium, Mad City Labs) for beam-steering one trap. Force measurements using the traps may be performed by back-focal plane interferometry of the condenser toplens (P 1.40 OIL S1 11551004, Leica) using a position-sensitive detector (DL100-7PCBA3, Pacific Silicon Sensor). Fluorescence microscopy may be achieved by imaging the stained DNA on an EMCCD camera (ixoNp 897E, Andor Technology). A 491-nm excitation laser (Cobolt Calypso 50 mW CW), and HQ540/80 m bandpass filter (Chroma Technology), may be used for imaging of YO-PRO-1, YOYO-1, SYBR Gold and SYTOX Green, and a 532-nm excitation laser (Cobolt Samba 50 mW CW) and FF01-580/60 bandpass filter (Semrock Inc.) may be used for imaging of SYTOX Orange and POPO-3.

The sample holder and/or the force application system may comprise a multichannel laminar flow cell mounted on an automated XY-stage (MS-2000, Applied Scientific Instrumentation), which allows rapid in situ construction and characterization of dumbbell constructs, and facilitates swift and complete transfer of tethered DNA between different flow channels. The flow cell and microspheres may be illuminated by a 450-nm light emitting diode (Roithner Lasertechnik GmbH) and imaged in transmission on a CMOS camera (DCC1545M, Thorlabs).

Intercalators are known to nonspecifically bind to glass surfaces and microfluidic tubing with high affinity. Such surface adsorption reduces the dye concentration in solution right after introducing dyes to a microfluidic system or after increasing the dye concentration. Surface desorption, on the other hand, increases the dye concentration when switching to a lower dye concentration. In order to ensure that during measurements a constant and well-defined dye concentration is present, the microfluidic system may be equilibrated using the dye-containing buffer. In equilibrium, surface adsorption equals dye desorption. Equilibration may be accomplished by thorough flushing with a large volume of intercalator. Equilibration of the dye concentration may be confirmed by monitoring changes in DNA elongation. A channel may be considered to be equilibrated in case the DNA elongation remains unaltered after additional flushing and remained constant over repeated measurements. The channel equilibration time may depend on the intercalator used. For example, YOYO (which exhibits a relatively strong glass adsorption properties) required at least 24 h of flushing for equilibration.

Figure 7B:
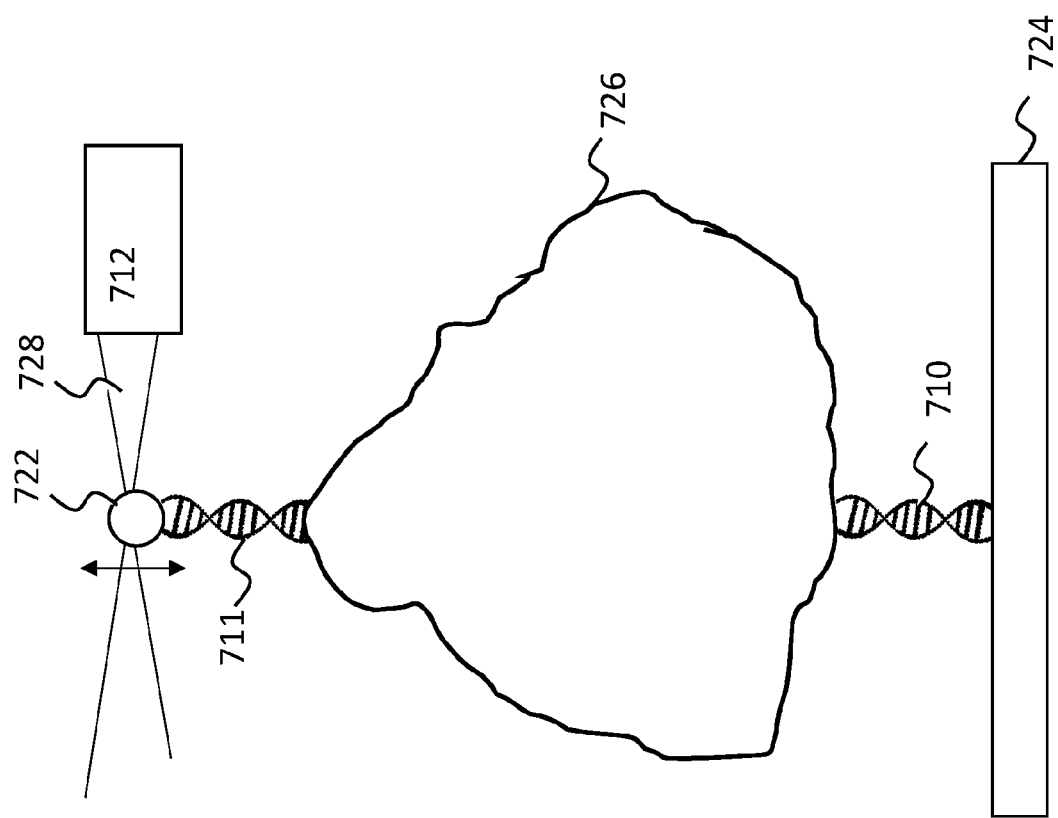
FIG. 7 schematically shows a set-up for performing a force measurement according to one embodiment involving another structure.
Figure 7A:
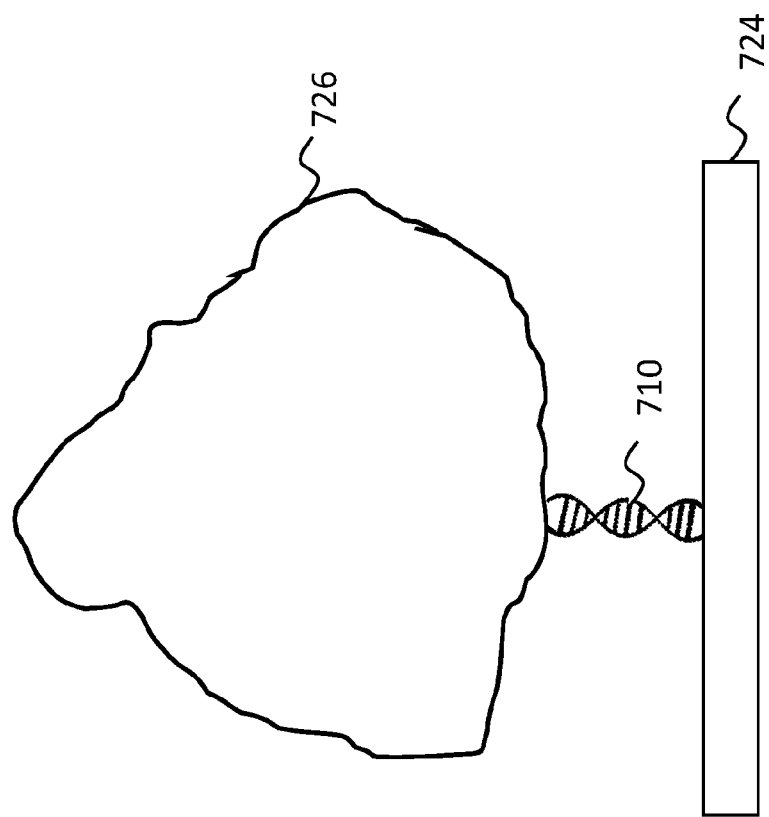

FIG. 7A illustrates that, in one embodiment, the structure 710 is connected to another structure 726, such as a cell, protein, virus particle, DNA or RNA molecule or any other structure. In this case the force acting on at least part of the structure 710 is exerted by the other structure 726 on the structure. Optionally the method comprises connecting the structure 710 and the other structure 726. The structure 710 may also be connected to yet another structure 724 such as a surface 724, e.g. a functionalized surface. The structure 710 may thus function as a connector between structure 724 and structure 726, e.g. as a DNA linker molecule. The connection between the structure and another structure may be physical, for example may comprise a covalent bond. Additionally or alternatively, this connection may be topological, which may be the case when both the structure 710 and the other structure 726 are entangled, for example as two linked ring shaped structures.

FIG. 7B illustrates that, in one embodiment, the method comprises controlling a force application system 712 to apply a force to the other structure 726.

As shown in the figure, this force need not be applied to the other structure 726 through the structure 710. In the example shown, the other structure 726 is a protein that is linked by the structure 710 to a surface 724. The protein 726 may additionally be connected to a trapped bead 722 and the position of the trap 728 holding the bead 722 may be controllable by the force application system 712 as described above. This embodiment allows to investigate the protein's mechanical response to the force applied to it. Herein, the mechanical response may thus be assessed by determining the force that the protein 726 applies to the structure 710 in response to the force applied by the force application system 712 to the other structure 726.

Figure 8:
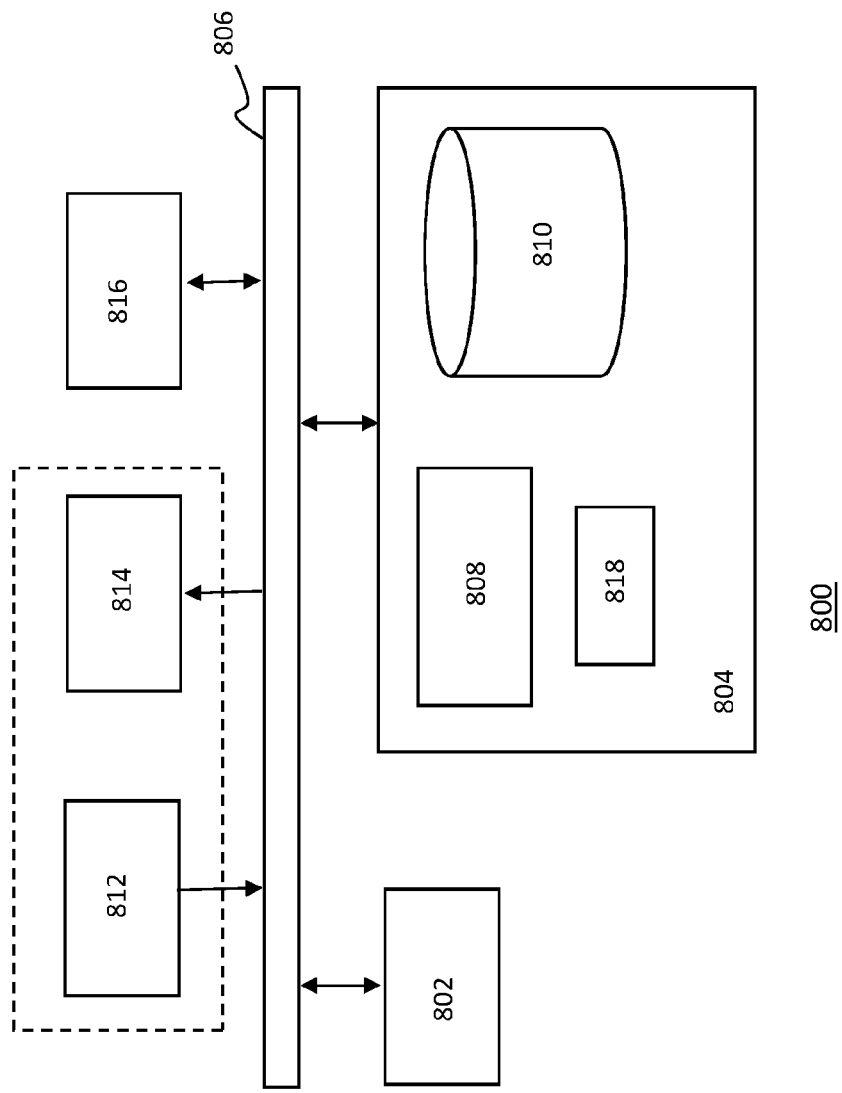
FIG. 8 shows a data processing system according to one embodiment.

FIG. 8 depicts a block diagram illustrating an exemplary data processing system that may be used in a computing system as described with reference to FIG. 1A.

As shown in FIG. 8, the data processing system 800 may include at least one processor 802 coupled to memory elements 804 through a system bus 806. As such, the data processing system may store program code within memory elements 804. Further, the processor 802 may execute the program code accessed from the memory elements 804 via a system bus 806. In one aspect, the data processing system may be implemented as a computer that is suitable for storing and/or executing program code. It should be appreciated, however, that the data processing system 800 may be implemented in the form of any system including a processor and a memory that is capable of performing the functions described within this specification.

The memory elements 804 may include one or more physical memory devices such as, for example, local memory 808 and one or more bulk storage devices 810. The local memory may refer to random access memory or other non-persistent memory device(s) generally used during actual execution of the program code. A bulk storage device may be implemented as a hard drive or other persistent data storage device. The processing system 800 may also include one or more cache memories (not shown) that provide temporary storage of at least some program code in order to reduce the number of times program code must be retrieved from the bulk storage device 810 during execution.

Input/output (I/O) devices depicted as an input device 812 and an output device 814 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 812 and the output device 814). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 816 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 800, and a data transmitter for transmitting data from the data processing system 800 to said systems, devices and/or networks. Modems, cable modems, and Ethernet cards are examples of different types of network adapter that may be used with the data processing system 800.

As pictured in FIG. 8, the memory elements 804 may store an application 818. In various embodiments, the application 818 may be stored in the local memory 808, the one or more bulk storage devices 810, or apart from the local memory and the bulk storage devices. It should be appreciated that the data processing system 800 may further execute an operating system (not shown in FIG. 8) that can facilitate execution of the application 818. The application 818, being implemented in the form of executable program code, can be executed by the data processing system 800, e.g., by the processor 802. Responsive to executing the application, the data processing system 800 may be configured to perform one or more operations or method steps described herein.

In one aspect of the present invention, the data processing system 800 may represent a controller as described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 802 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A method for determining an activity of an enzyme that is interacting with at least part of a structure, the method comprising:
    controlling a light-sensitive system to determine light information based on light from the structure, the light being incident on at least part of the light-sensitive system, wherein the at least part of the structure comprises one or more optically active entities, wherein at least one of (i) an optical activity of the one or more optically active entities and (ii) a quantity of the one or more optically active entities depends on a tension in the at least part of the structure, the tension being generated by enzymatic reactions involving the enzyme, and wherein the light information defines a light property value associated with the at least part of the structure; and
    determining the activity of the enzyme on the basis of the light property value.

2. The method according to claim 1, wherein the structure is a DNA molecule and wherein the activity of the enzyme comprises the enzyme processing along at least part of the DNA molecule.

3. The method according to claim 1, wherein the one or more optically active entities comprise DNA intercalator molecules.

4. The method according to claim 1, further comprising:
    obtaining a parameter relating (i) a difference between two different degrees of the activity of the enzyme to (ii) a difference between two light property values associated with the two different degrees, and
    determining the activity of the enzyme based on said parameter.

5. The method according to claim 1, wherein the one or more optically active entities comprise at least one pair of a donor fluorophore and an acceptor fluorophore, the at least one pair exhibiting an emission spectrum that depends on tension generated in the at least part of the structure.

6. The method according to claim 1, further comprising:\
    controlling the light-sensitive system to determine reference light information based on reference light from a reference structure while a reference enzyme is interacting with at least part of the reference structure, the reference light being incident on at least part of the light-sensitive system, wherein:
    the at least part of the reference structure comprises one or more optically active reference entities and wherein at least one of (i) an optical activity of the one or more optically active reference entities and (ii) a quantity of the one or more optically active reference entities depends on a tension in the at least part of the reference structure, the tension being generated by enzymatic reactions involving the reference enzyme and wherein the reference light information defines a reference light property value that is associated with the at least part of the reference structure.

7. The method according to claim 6, further comprising:
    controlling the light-sensitive system to determine second reference light information based on second reference light from a second reference structure while a second reference enzyme is interacting with at least part of the second reference structure, the second reference light being incident on at least part of the light-sensitive system, wherein:
    the at least part of the second reference structure comprises one or more optically active second reference entities and wherein at least one of (i) an optical activity of the one or more optically active second reference entities and (ii) a quantity of the one or more optically active second reference entities depends on a tension in the at least part of the second reference structure, the tension being generated by enzymatic reactions involving the second reference enzyme and wherein the second reference light information defines a second reference light property value associated with the at least part of the second reference structure, and wherein the method comprises:

determining the activity of the enzyme based on both (i) the light property value and (ii) the second reference light property value.

8. The method according to claim 1, wherein the structure is at least partially positioned in a fluid comprising one or more optically active entities, wherein a binding property of the one or more optically active entities in respect of the at least part of the structure depends on the tension in the at least part of the structure.

9. The method according to claim 6, wherein:

while the reference light is incident on the at least part of the light-sensitive system, a first concentration of one or more optically active entities is present in the fluid, the method further comprising:

controlling the light-sensitive system to determine second reference light information based on second reference light from the reference structure while the reference enzyme is interacting with the at least part of the reference structure, the second reference light being incident on at least part of the light-sensitive system, wherein while the second reference light is incident on the at least part of the light-sensitive system, a second concentration of one or more optically active entities different from the first concentration is present in the fluid, and wherein:

the second reference light information defines a second reference light property value associated with the at least part of the reference structure, and wherein the method comprises:

determining the activity of the enzyme based on both (i) the light property value and (ii) the second reference light property value.

10. The method according to claim 1, wherein one or more parameters of the one or more optically active entities are selected such that perturbation of the interaction between the enzyme and the at least part of the structure is reduced.

11. The method according to claim 10, wherein the quantity of the one or more optically active entities is selected such that perturbation of the interaction between the enzyme and the at least part of the structure is reduced.

12. The method according to claim 11, wherein the quantity of the one or more optically active entities is selected such that a ratio between (i) a number of binding sites of the at least part of the structure at which an optically active entity is bound and (ii) a total number of binding sites of the at least part of the structure is lower than 50%.

13. The method according to claim 10, wherein a kinetic off-rate of the one or more optically active entities is selected such that perturbation of the interaction between the enzyme and the at least part of the structure is reduced.

14. The method according to claim 13, wherein the kinetic off-rate of the one or more optically active entities is selected such that the kinetic off-rate of the one or more optically active entities is at least equal to a rate at which events occur in the interaction between the enzyme and the at last part of the structure.

15. A controller configured to perform steps of:

controlling a light-sensitive system to determine light information based on light from a structure, the light being incident on at least part of the light-sensitive system, wherein at least part of the structure comprises one or more optically active entities, wherein at least one of (i) an optical activity of the one or more optically active entities and (ii) a quantity of the one or more optically active entities depends on a tension in the at least part of the structure, the tension being generated by enzymatic reactions involving an enzyme, and wherein the light information defines a light property value associated with the at least part of the structure; and determining the activity of the enzyme on the basis of said light property value.

16. A non-transitory computer-readable storage medium comprising instructions which, when executed by a computer, cause the computer to:

determine an activity of an enzyme that is interacting with at least part of a structure on the basis of a light property value associated with the at least part of the structure, the light property value being defined by light information, the light information being determined by a light-sensitive system based on light from the structure incident on at least part of the light-sensitive system, wherein:

the at least part of the structure comprises one or more optically active entities, wherein at least one of (i) an optical activity of the one or more optically active entities and (ii) a quantity of the one or more optically active entities depends on a tension in the at least part of the structure, the tension being generated by enzymatic reactions involving the enzyme.

17. A method for causing at least part of a structure to exhibit a tension-dependent optical activity for enabling determination of an activity of an enzyme that is interacting with the at least part of the structure, the method comprising combining the at least part of the structure with a fluid and one or more optically active entities, wherein the one or more optically active entities in the fluid can bind to the at least part of the structure and wherein at least one of:

a binding property of the one or more optically active entities in respect of the at least part of the structure depends on tension generated in the at least part of the structure by enzymatic reactions involving the enzyme; and an optical property of the one or more optically active entities bound to the at least part of the structure depends on tension generated in the at least part of the structure by enzymatic reactions involving the enzyme.

* * * * *